(12) United States Patent
Wolfe

(10) Patent No.: US 6,263,351 B1
(45) Date of Patent: *Jul. 17, 2001

(54) DOCUMENT RESEARCH SYSTEM AND METHOD FOR EFFICIENTLY DISPLAYING AND RESEARCHING INFORMATION ABOUT THE INTERRELATIONSHIPS BETWEEN DOCUMENTS

(76) Inventor: Mark A. Wolfe, 1076 Tamberwood Ct., Woodbury, MN (US) 55125

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/245,183

(22) Filed: Feb. 5, 1999

Related U.S. Application Data

(63) Continuation of application No. 09/014,669, filed on Jan. 28, 1998, now Pat. No. 5,870,770, which is a continuation of application No. 08/487,925, filed on Jun. 7, 1995, now abandoned.

(51) Int. Cl.[7] ................................................. G06F 17/30
(52) U.S. Cl. ............................................. 707/501; 707/526
(58) Field of Search .............................. 707/501, 513, 707/517, 526, 514; 345/346

(56) References Cited

U.S. PATENT DOCUMENTS

| | | | |
|---|---|---|---|
| 5,524,193 | * 6/1996 | Covington et al. | 707/512 |
| 5,526,520 | * 6/1996 | Krause | 707/104 |
| 5,623,679 | * 4/1997 | Rivette et al. | 707/512 |
| 5,632,022 | * 5/1997 | Warren et al. | 345/350 |
| 5,644,686 | * 7/1997 | Hekmatpur | 706/45 |
| 5,768,578 | * 6/1998 | Kirk et al. | 707/100 |
| 5,778,398 | * 7/1998 | Nagashima et al. | 707/501 |
| 5,802,292 | 9/1998 | Mogul | 395/200.33 |
| 5,860,074 | * 1/1999 | Rowe et al. | 707/526 |
| 5,870,770 | * 2/1999 | Wolfe | 707/501 |
| 5,915,256 | * 6/1999 | Rogers et al. | 707/501 |
| 5,963,205 | 10/1999 | Sotomayor | 345/333 |

OTHER PUBLICATIONS

*Using Mosaic*, Que Corporation, 1994, pp. 31–44 and 80–85.*
Roscheisen, "Beyond Browsing: Shared Comments, SOAPs, Trails, and Online Communities," Computer Networks and ISDN Systems, Apr. 10, 1995.
Brown, Using Netscape 2, pp. 773–786 (Que 1995).

* cited by examiner

*Primary Examiner*—Stephen S. Hong

(57) ABSTRACT

A system for displaying, on a computer screen, information concerning the interrelationships of documents. A system employing the present invention also allows for the efficient research of documents that cite a document shown on the computer screen. In one embodiment, the present invention involves displaying at least a portion of a first document and simultaneously displaying a representation of one or more citing documents. The citing documents cite some portion of the displayed document. In another embodiment, the invention involves displaying at least a portion of a first document, and displaying a representation of one or more citing documents, wherein the displayed citing documents cite the displayed portion of the first document.

12 Claims, 39 Drawing Sheets

```
                              ┌── 103    ┌── 104           ┌── 105
                              │          │                 │
                              /Copr. (C) West 1995 No claim to orig. U.S. govt. works
    ┌ Citation      /  Rank (R)     Page(P)           Database          Mode
    │ 904 F.2d 677     R 2 of 3     P 1 of 39         CTA               PAGE
102 │ 14 U.S.P.Q.2d 1942
    │ (CITE AS: 904 F.2D 677)
    └

WILSON SPORTING GOODS CO., Plaintiff-Appellee,
                                        v.
         DAVID GEOFFREY & ASSOCIATES d/b/a Slazenger, and Dunlop Slazenger Corporation
                 aka Dunlop Sports Corporation, Defendants-Appellants.
                              Nos. 89-1554, 89-1555.
                            United States Court of Appeals,
                                   Federal Circuit.
                                    May 23, 1990.
                             Rehearing Denied July 5, 1990.
                           Suggestion for Rehearing In Banc
101                            Declined July 27, 1990.

In actions alleging infringement of patent claim for certain configuration of
    dimples on a golf ball cover, the United States District Court for the District
    of South Carolina, William M. Catoe, Jr., United States Magistrate, found the
    patents valid and infringed, and entered judgments accordingly.  Appeals were
    taken and colosidated.  The Court of Appeals, Rich, Circuit Judge, held that:
    (1) alleged infringer's motion for JNOV on infringement was timely and
    supported by its motion for directed verdict, and (2) claims were not infringed
    under doctrine of equivalents.
```

*Figure 1a*

```
                          Copr. (C) West 1995 No claim to orig. U.S. govt. works
904 F.2d 677        FOUND DOCUMENT          P 25 OF 39   CTA            PAGE
(CITE AS 904 F.2d 677, *682)

F.2d 1546, 1550-52 & n. 8, 10 U.S.P.Q.2d 1201, 1206-07 & n. 8
     (Fed.Cir.1989) (JNOV on infringement).

[1] We are persuaded by the Notes of the Advisory Committee on the
1963 Amendments to the Federal Rules of Civil Procedure and by comparison of
Rule 50 with Rules 52 and 59.  The Advisory Committee Notes to Rule 50 state
that the time limit for Rule 50(b) is consistent with that set forth in Rule
59(b) for moving for a new trial and in Rule 52(b) for moving to amend findings
by the district court.  Rule 59(b) explicitly states that a motion for new
trial "shall be served not later than ten days after entry of the judgment"
(our emphasis).  Similarly, the Sixth Circuit has held that a Rule 52(b)
motion, which contains language very similar to Rule 50(b), is timely if served
on the tenth day after judgment and filed on the eleventh day.  Keohane v.
Swarco, Inc., 320 F.2d 429, 432 (6th Cir. 1963).
  In Keohane, the Sixth Circuit did not consider the Advisory Committee
Notes, but relied on Rule 5(d) which states:
    (d) Filing.  All papers after the complaint required to be served upon a
party shall be filed with the court either before service or within a
reasonable time thereafter.
  The court concluded that "there would not be much reason to have Rule 5(d) if
the papers had to be both served and filed within the 10 day period."  Id. at
```

*Figure 1b*

```
                    SHEPARD'S (Rank 1 of 2)              Page 2 of 8
CITATIONS TO: 904 F.2d 677
CITATOR: FEDERAL REPORTER CITATIONS
DIVISION: Federal Reporter 2nd
Retrieval                                              Headnote
   No.         -----Analysis-----      -----Citation-----    No.
    1                                  140 F.R.D. 121, 127    10
    2                                  140 F.R.D. 121, 127    11
    3                                  146 F.R.D. 353, 378

Cir. DC
    4                                  778 F.Supp. 544, 553    6

Cir. 1
    5                                  737 F.Supp. 1227, 1238  6
    6                                  737 F.Supp. 1227, 1238  7
    7         F     Followed           796 F.Supp. 640, 646
                        \
                         \___ 122         Cir. 2
    8                                  992 F.2d 12, 15

Insta-Cite    Shepard's PreView    QuickCite   Commands    SCOPE
Copyright (C) 1995 McGraw-Hill, Inc.; Copyright (C) 1995 West Publishing Co.
```

DOCUMENT RESEARCH SYSTEM AND METHOD FOR EFFICIENTLY DISPLAYING AND RESEARCHING INFORMATION ABOUT THE INTERRELATIONSHIPS BETWEEN DOCUMENTS

This application is a continuation of application Ser. No. 09/014,669, filed Jan. 28, 1998, now U.S. Pat. No. 5,870,770, which is a continuation of application Ser. No. 08/487,925, filed Jun. 7, 1995, now abandoned. Both of these applications are hereby fully incorporated by reference.

FIELD OF THE INVENTION

The present invention relates to a system and method of displaying information on a computer screen. A system employing the present invention provides an efficient procedure for researching documents and the interrelationships between documents. The present invention is particularly applicable to research involving documents that extensively cite or refer to other documents.

BACKGROUND OF THE INVENTION

The nature of many academic and professional writings is such that authors rely upon and cite previously published works, studies, or test results to support arguments or opinions. For example, in the common law system in America, lawyers and judges cite and rely upon previously decided cases (i.e., written judicial opinions) to support their arguments and opinions. The American common law system is particularly reliant upon the precedent established by previous case decisions because a judicial court (or judge) will usually consider as very persuasive a previously-decided case in which the same legal issue has been resolved or decided.

However, courts will not always agree with, or be bound by, previously-decided cases. Instead of agreeing with a conclusion reached in a previous case, or "following" it, courts may occasionally, disagree with, criticize, question, reverse, or overrule the previous case. Therefore, beginning with the first time a case is cited in a subsequent case, the earlier case's authoritative value can change. For example, if a persuasive judge is critical of the earlier case, that earlier case will be less authoritative than it was before the judge's critical treatment of the case. On the other hand, if the judge strongly supports the reasoning of the earlier case, the authoritative value of the earlier case will be enhanced. Virtually every time a case is discussed or cited, its authoritativeness or precedential status is affected. The importance or precedential status of a case can continue to evolve over many years as a result of interpretations given to it by judges in subsequent cases.

Therefore, when considering a legal issue decided in a court's written opinion or decision, it is critical to consider what subsequent cases have said about it. Lawyers performing legal research consequently have a need to determine which later cases have discussed (and therefore, cited) in any given earlier case. For many years, lawyers have been able to find out which later cases have cited any given case by using a tool known as Shepard's Citations published by McGraw-Hill, Inc. Shepard's Citations is basically an organized index that lists all the cases that have cited a particular case. When a later case cites an earlier case, there is usually some discussion of the earlier, cited case. Shepard's Citations also sometimes gives a brief indication of how the later case treated the earlier case of interest (e.g., the later case may have "followed," "criticized," or "questioned" the earlier case).

In recent years, legal research has been increasingly performed by lawyers using computerized legal research systems. The most popular of these may be the on-line legal research systems, such as Westlaw and LEXIS/NEXIS. However, legal research systems employing local CD-ROM or other databases have become quite popular.

FIG. 1a is a representation of a screen taken from the Westlaw legal research system operated by the West Publishing Company. The screen shows a portion of the text of the Wilson Sporting Goods case shown at 101 in FIG. 1a. The title bar 102 includes the citations 103 for the Wilson case, which are 904 F.2d 677, and 14 U.S.P.Q.2d 1942. These two citations mean that the Wilson case can be found starting at page 677 of volume 904 of the F.2d reporter series, or alternatively, starting at page 1942 of volume 14 of the U.S.P.Q.2d reporter series.

Also shown in the title bar 102 is the "rank" 104 of the displayed document, which is simply the position or order of the Wilson case with respect to all of the other documents found in the search conducted by the user. In this particular example, the Wilson case is ranked second out of three search documents. Each of the search documents is a document that satisfies a particular query entered by the user, and in the example shown in FIG. 1a, three documents in the database CTA satisfy the user's query.

The current page number and the number of pages in the document are shown in FIG. 1a at 105. The number of pages essentially corresponds to the number of screens the Wilson case fills. For example, FIG. 1a shows the first Westlaw page of the Wilson case, and FIG. 1b shows Westlaw page 25. FIG. 1b is the screen that is twenty-fifth of the thirty-nine screens that make up the Wilson case. FIGS. 1a and 1b thus simply show different portions of the text of the Wilson case.

As described above, when researching issues that are discussed in the Wilson case, it is very useful to see what subsequently decided cases have said about the analysis in the Wilson case. The Westlaw system provides access to this type of information through a number of services, one of which is the on-line version of Shepard's Citations. In the Westlaw system, the user can access this information by selecting a menu item from a pull-down menu or by selecting (i.e., "clicking on") an on-screen button. When the user selects the Shepard's Citation service in Westlaw while viewing the Wilson case, a screen similar to that shown in FIG. 1c is displayed.

The top of FIG. 1c shows at 110 a citation to the cited document, 904 F.2d 677, which is the citation to the Wilson case. Thus, the Wilson case is considered, in this screen, to be the "cited" document. A parallel citation to the Wilson case is shown at 114. FIG. 1c also contains a list 112 of citations to a number of cases. The citations in this list 112 are references to cases which cite the Wilson case. These cases listed at 112 are called "citing cases" because they are later cases that cite the Wilson case (i.e., the cited case). In other words, the text of each of the cases shown in the list 112 contains a specific reference to the Wilson case.

The citation 116 at the bottom of FIG. 1c ("140 F.R.D. 121, 127"), indicates that a case having a citation to the Wilson case can be found starting at page 121 of volume 140 of the F.R.D. (Federal Rules Decisions) reporter series. The specific citation or reference to the Wilson case can be found on page 127 of that volume. FIG. 1c also shows at 118 that this citation references headnote 9 of the Wilson case. This means that the case at 140 F.R.D. 121 cites the Wilson case for the issue discussed at headnote 9 of the Wilson case. The headnotes are prepared and categorized by the West Publishing Company.

As suggested at 120 of FIG. 1c, the Shepard's listing for the Wilson case spans eight Westlaw screens. Page 2 of the Shepard's listing is shown in FIG. 1d. This page lists additional citing cases (i.e., cases that cite the Wilson case). As can be seen from FIGS. 1c and 1d, the Shepard's citations are listed in a somewhat organized manner. For example, in FIG. 1d, the cases decided in the First Circuit that cite the Wilson case are listed under the heading "Cir. 1, " and the cases in the Second Circuit that cite the Wilson case are listed under heading "Cir. 2."

FIG. 1d also shows an instance in which the Shepard's listing analyzes one of the listed citations. At 122, the Shepard's listing suggests that the case published at 796 F.Supp. 640 (the "citing case") "followed" the analysis or reasoning of the Wilson case. This means that the citing case (found at 796 F.Supp. 640) applied the same analysis as the court in the Wilson case. The Shepard's Citations listing also will occasionally provide other analysis of citing cases, and may, for example, point out those cases which "explain," "criticize," or "reverse" the Wilson case.

As described above, the Westlaw system allows the researcher to see a list of citing cases, such as that provided by Shepard's Citations. However, the Westlaw system requires the user to move to another screen to see these citations, thereby covering the displayed text of the case of interest. This is distracting to the researcher, because once the text of the case is no longer displayed, the researcher cannot refer back to the displayed text without removing the citations from the screen. In addition, because the citations list in Westlaw can often be many screens in length, the user must perform the tedious task of paging through the entire citations list and uncovering those citations that are relevant to the particular portion of the displayed document that the researcher is studying. The Westlaw system and others in the art are therefore relatively unsophisticated in the manner in which they display lists of citing cases. None of the computer-based research systems in the art provide a listing of citing cases which is based on the context of the displayed document. Thus, none provide any indication of which citing cases specifically refer to the text displayed on the screen or selected by the user.

SUMMARY OF INVENTION

The present invention relates to a method of displaying documents in a research system. In one embodiment, the method involves displaying at least a portion of a first document and simultaneously displaying a representation of one or more citing documents. The citing documents cite some portion of the displayed document.

In another embodiment, the method involves displaying at least a portion of a first document, and displaying a representation of one or more citing documents, wherein the citing documents cite the displayed portion of the first document. The citing documents could alternatively cite a highlighted part of the displayed portion of the first document.

Other embodiments are described in the Detailed Description.

It is an object of the present invention to provide a method and system for efficiently researching interrelated documents.

It is a further object of the present invention to provide a method and system for analyzing the precedential value of a judicial opinion.

It is a still further object of the present invention to provide a method and system for effectively conveying to the researcher information concerning the interrelationships of documents.

BRIEF DESCRIPTION OF THE DRAWINGS

FIGS. 1a to 1d are displays illustrating the operation of the Westlaw research system.

FIG. 10b is a window displayed upon selection of button 1008 in FIG. 10a.

FIG. 10c illustrates the scrolling of the text of the document displayed in FIG. 10a.

FIG. 12b illustrates a different portion of the web page of FIG. 12a.

DETAILED DESCRIPTION

The present invention relates to a method of displaying interrelationships of documents on a computer screen. Specifically, the present invention relates to a computerized research system that provides the researcher with information about documents that cite a document that the user is studying.

Figure 1C:
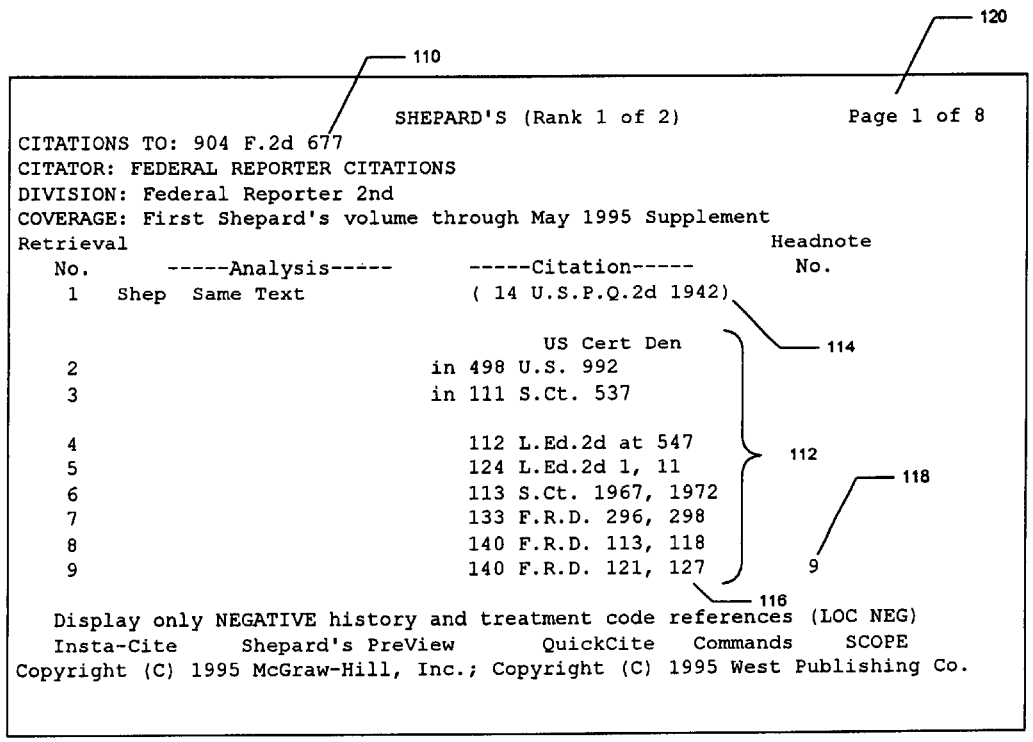
Figure 2:
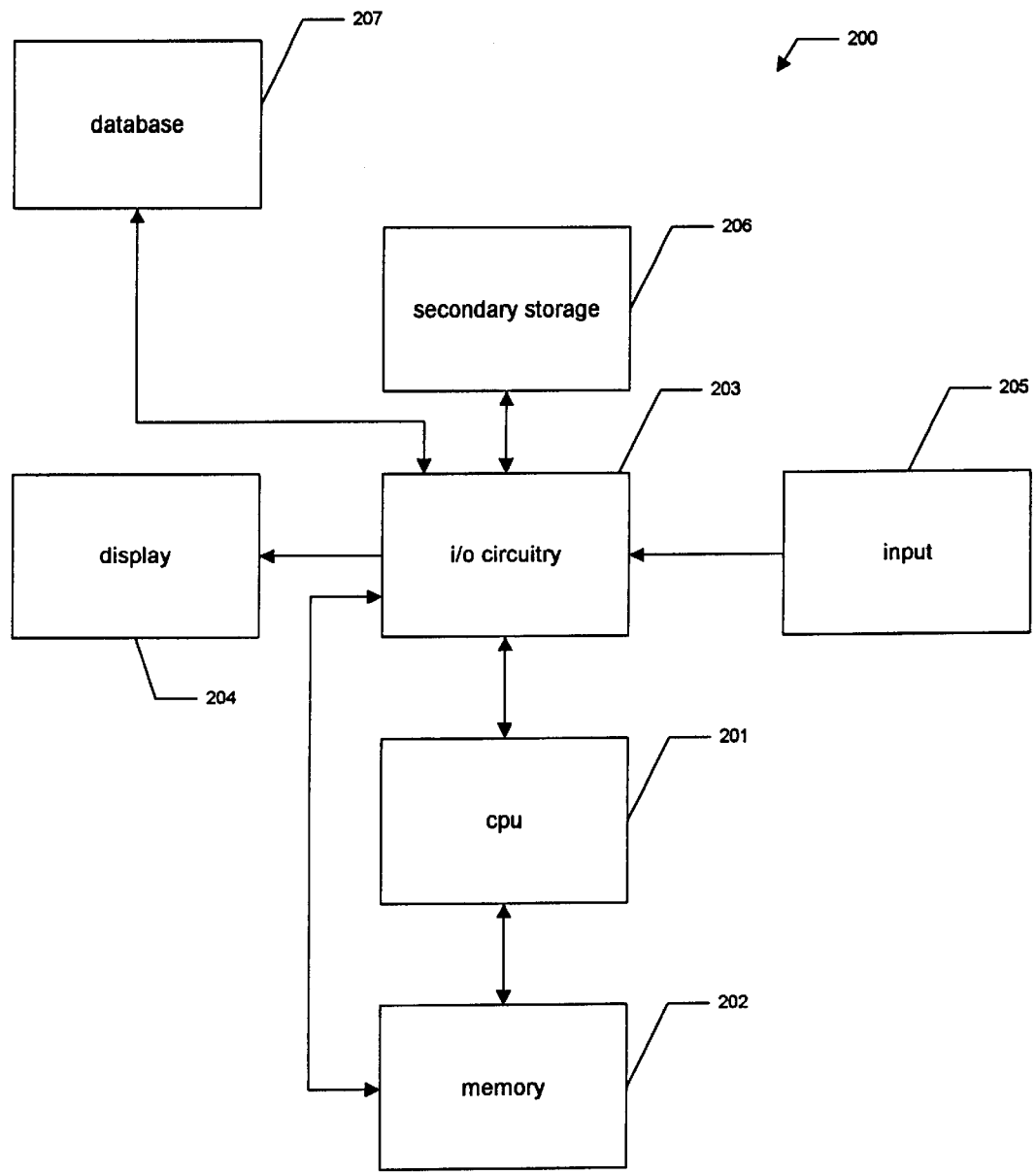
FIG. 2 is a block diagram of a system in accordance with an embodiment of the present invention.

FIG. 2 shows a block diagram of a system in one embodiment of the present invention. The system 200 has a central processing unit (CPU) 201, a memory unit 202, and i/o circuitry 203. The cpu 201 is connected to i/o circuitry 203 to permit data transfers with input devices 205 and display 204. The input device 205 can be a keyboard, pen, mouse, voice-recognition circuitry, or any other input device known to those in the art. Some type of secondary or mass storage 206 is generally considered desirable. In a typical implementation, the secondary storage is a hard or floppy disk. Generally, any data storage medium as is known in the art can be used as the secondary storage 206. The secondary storage 206 can also be eliminated by providing a sufficient amount of memory in the memory unit 202. The memory 202 or, alternatively, the secondary storage 206 are considered data storage mediums. It is also possible to have an input device act as a data storage medium.

The physical structure of the database 207 may involve one or more hard disks, CD-ROMs, or any other mass storage devices and may or may not be distributed. The database 207 may also be integrated into the secondary storage device 206. As is well known in the art, the database 207 can be near or local to the CPU 201, or it can be remotely located relative to the CPU 201. Any type of database 207 that is capable of operating according to the present invention is appropriate.

Figure 3A:
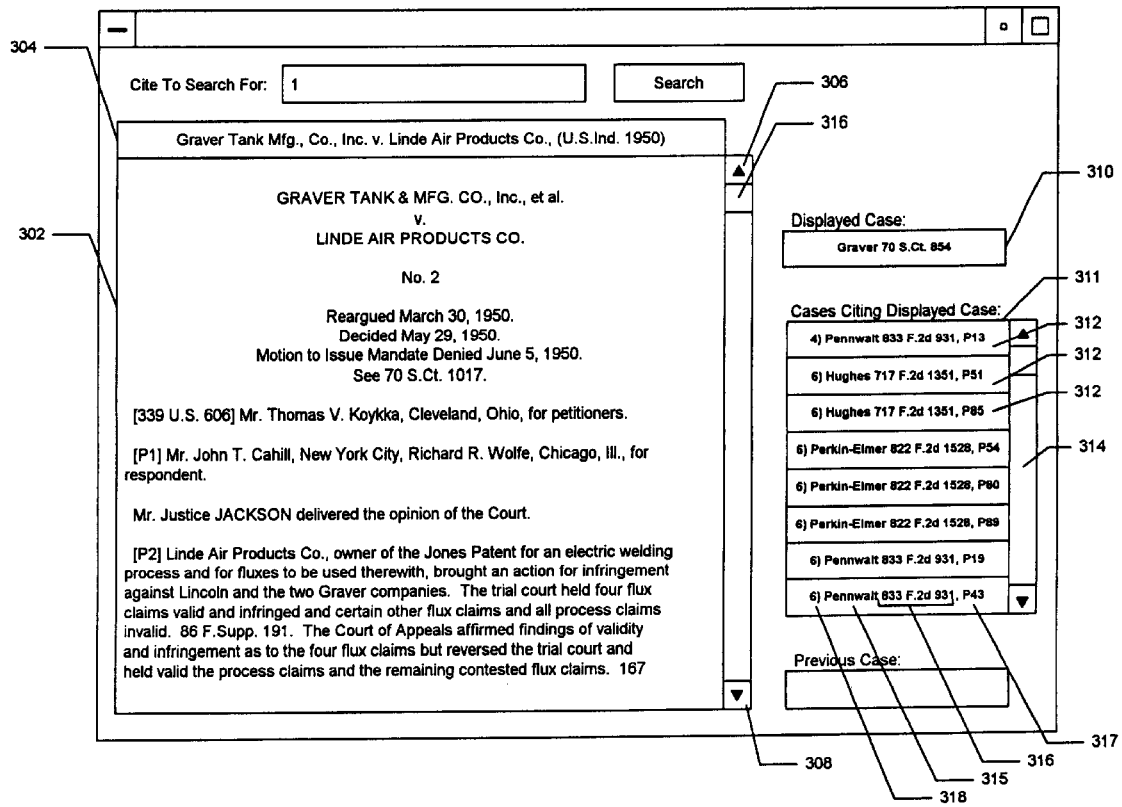
FIG. 3a is a view of a screen on which the text of a document is displayed, and representations of citing documents are also displayed.
Figure 3B:
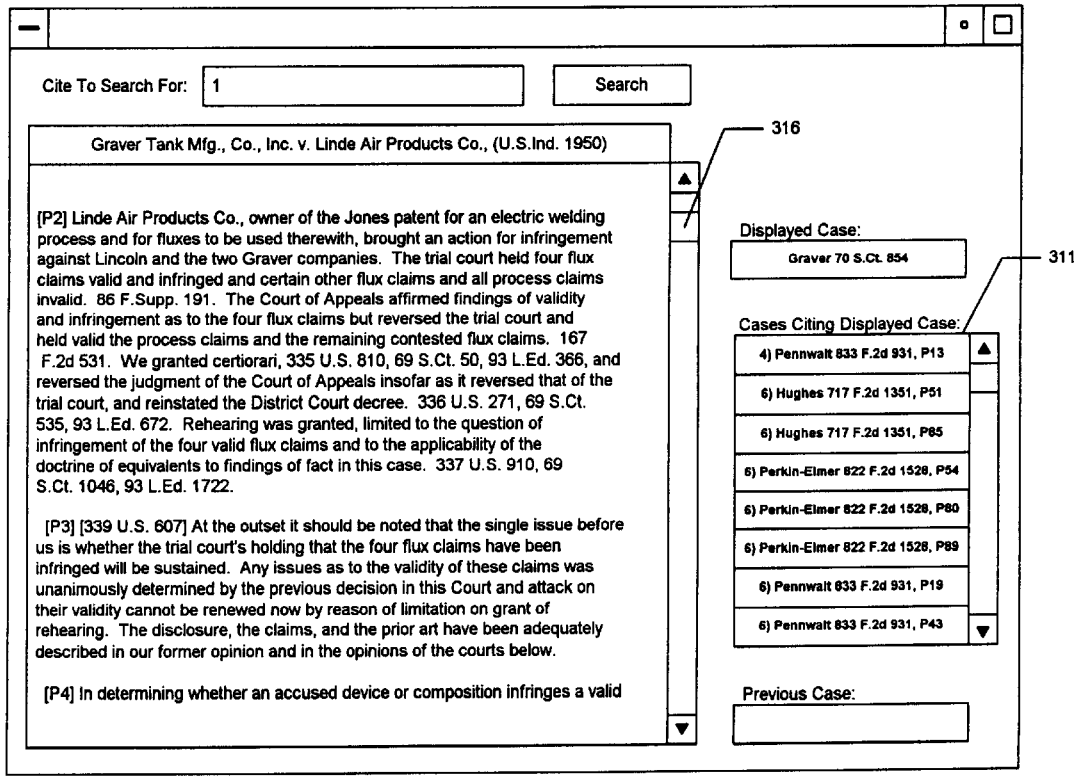
FIG. 3b is a view of the screen of FIG. 3a after the user has scrolled the text of the document.

FIG. 3a is a display illustrating one embodiment of the present invention in which the text window 302 shows the text of the first portion of the Graver Tank case that was decided by the U.S. Supreme Court in 1950. The title window 304 contains the brief title of the Graver Tank case, and the box 310 shows a citation to the Graver Tank case. The scroll bar 306 allows the user to scroll through the text of the Graver Tank case by selecting the down arrow button 308 or by moving the scroll button 316 in a manner well known in the art. FIG. 3b shows the text window 302 after the user has moved the scroll button 316 down slightly.

FIGS. 3a and 3b also show a citing cases box 311 in which representations 312 of a number of cases that cite the Graver Tank case are listed. The citing cases box 311 is simply an area on the screen in which the representations of citing cases can be placed. Scroll bar 314 allows the user to scroll through additional representations of citing cases when there are more representations of citing cases in the box 311 than there is room for on the screen. Preferably, the citing cases box would include a representation of all existing cases that cite the Graver Tank case. However, normally only those cases in the database 207 that cite the Graver Tank case are shown. The database 207 may or may not be up-to-date.

The representations of the cases in the box 311 can be listed in a particular order, such as by date decided, or by jurisdiction, or by some other characteristic. It is also possible to include only a subset of the cases in the database. For example, the user may only be interested in seeing representations of cases that come from a particular court or group of courts, or from a particular period of time.

A representation is herein defined to be any indication, marker, button, menu item, link, or reference associated with another a document. A representation could also be labelled with the title, citation, or some other portion of the document. However, the representation need not be labelled as shown in the Figures. Representations may have any other labelling or alternatively, no labelling at all. A representation may correspond to a single document, or it may correspond to more than one document, or a group of documents. For example, instead of having a representation for each document, a representation may be simply a button that corresponds to a plurality of documents, where the representation is labelled to indicate the number of citations the representation corresponds to.

In FIGS. 3a and 3b, the citing cases box 311 has a representation 312 for each of the cases that cite the Graver Tank case. In the embodiment shown, the citing cases box 311 contains eight representations of cases that cite the Graver Tank case. The representations 312 shown in this embodiment are labelled so as to indicate the name 315 of the citing case, the citation 316 to the citing case, the paragraph 317 in the citing case that cites the Graver Tank case, and also the Graver Tank paragraph 318 that is cited by the citing case. Thus, from this first representation, it can be seen that paragraph 43 of the Pennwalt case cites the sixth paragraph of the Graver Tank case. Similarly, the representation at the top of the box indicates that paragraph 13 of the Pennwalt case, which is reported at 833 F.2d 931, cites paragraph four of the Graver Tank case. There is more than one representation for the Pennwalt case because the Pennwalt case cites the Graver Tank case more than once. Similarly, the citing cases box 311 shows the Perkin-Elmer case cites the sixth paragraph of the Graver Tank case three times.

Figure 3C:
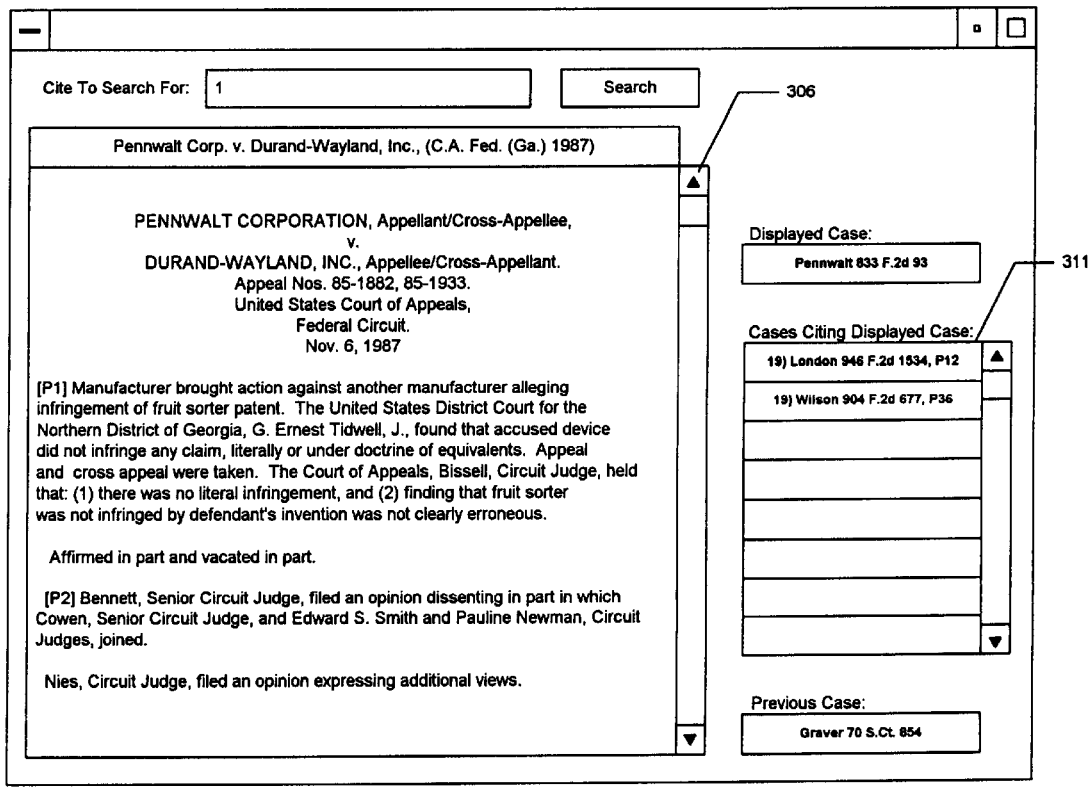
FIG. 3c is a view of the screen after selection of one of the representations of the citing documents.

The user can display one of these citing cases by selecting a representation shown in the citing cases box 311. FIG. 3c shows how the display is updated when the user selects the first representation shown in the citing cases box 311. Selection can be done by any means known in the art, such as by keyboard, mouse, pen, touch-screen, voice command, or otherwise. The text box 302 of FIG. 3c has been updated to show the beginning of the Pennwalt case, which corresponds to the representation at the top of the citing cases box 311 in FIG. 3b. The user can scroll through the text of the Pennwalt case in FIG. 3c by manipulating the scroll bar 306.

Also as shown in FIG. 3c, the citing cases box 311 is updated to contain representations of the cases that cite the Pennwalt decision. The representations of the cases citing the Graver Tank case are removed from the citing cases box 311. Thus, when the text box contains a new case, the citing cases box 311 is updated to reflect the cases that cite the new decision.

Figure 4:
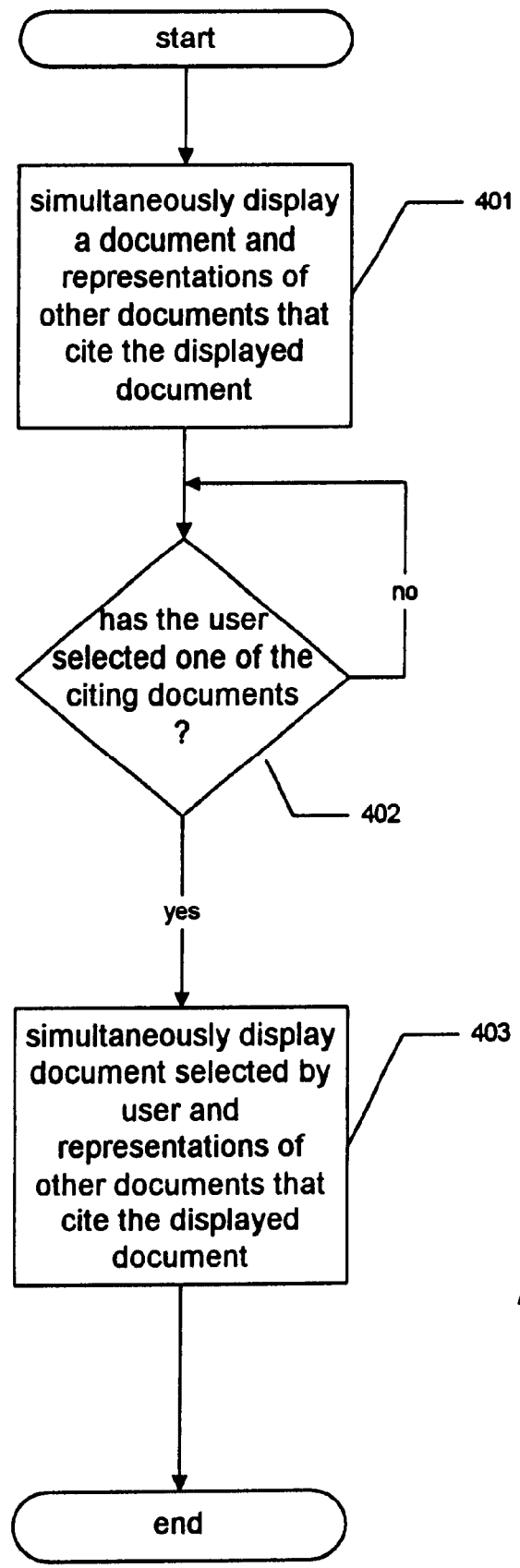
FIG. 4 is a flow diagram of the process steps in one embodiment of the present invention.

FIG. 4 is a flow chart illustrating an embodiment similar to that described in connection with FIGS. 3a, 3b, and 3c. As shown, the first step 401 in the flow chart involves simultaneously displaying a portion of a document (such as the portion displayed in the text box 302 in FIGS. 3a to 3c), and also simultaneously displaying representations of documents that cite the displayed document. This simultaneous display allows the user to see, at the same time, both the text of the document, and also the representations of the citing cases.

In the next step 402, the system checks to see if the user has selected one of the representations. Once the user does select one of the representations, step 403 updates the display to show the citing case corresponding to the selected representation and also to show representations of cases that cite the new displayed case.

FIGS. 5a to 5i illustrate an alternate embodiment of the present invention in which the citing cases box only lists representations of cases that cite the displayed text. For example, in the text box 302 of FIG. 5a, the first few lines of the Graver Tank case are shown. As illustrated in FIG. 3a, there are a number of cases that cite some portion of the Graver Tank case. However, in FIG. 5a, none of those cases specifically cite the any of the text shown in the text box 302. Instead, the citing cases listed in the citing cases box 311 of FIG. 3a all cite some other portion of the Graver Tank case.

Figure 5A:
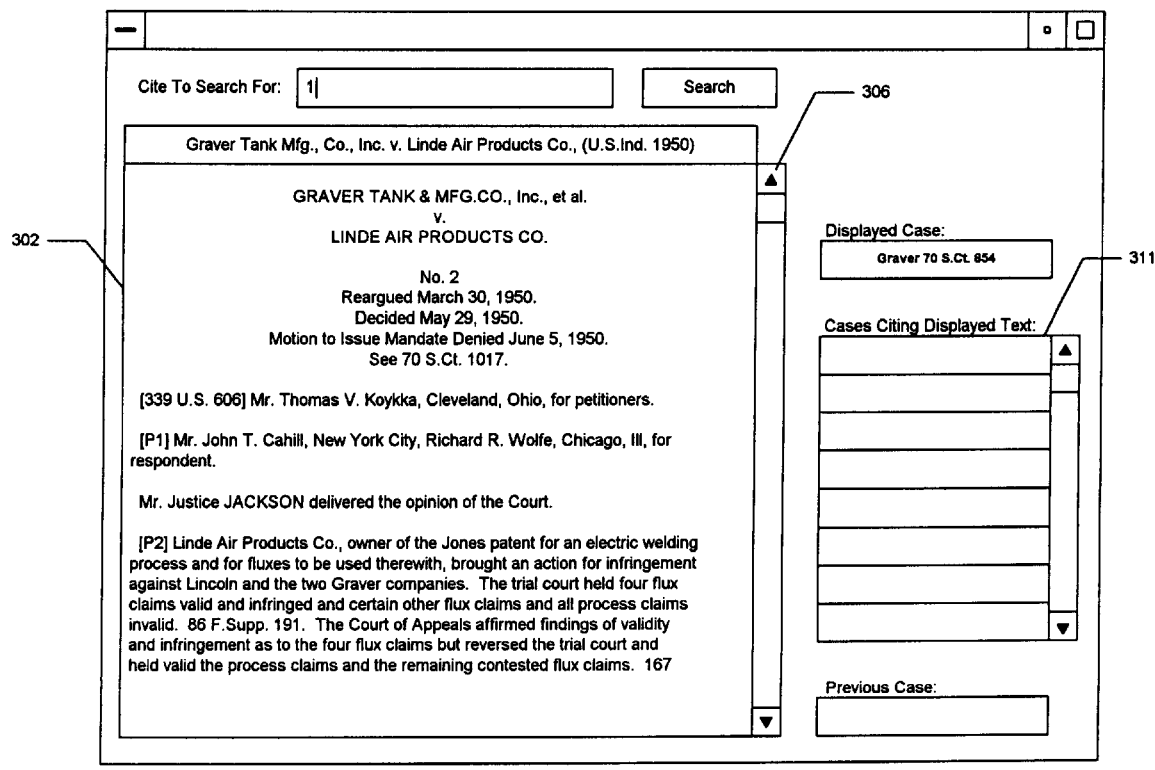
FIG. 5a is a view of a screen in another embodiment of the present invention.
Figure 5B:
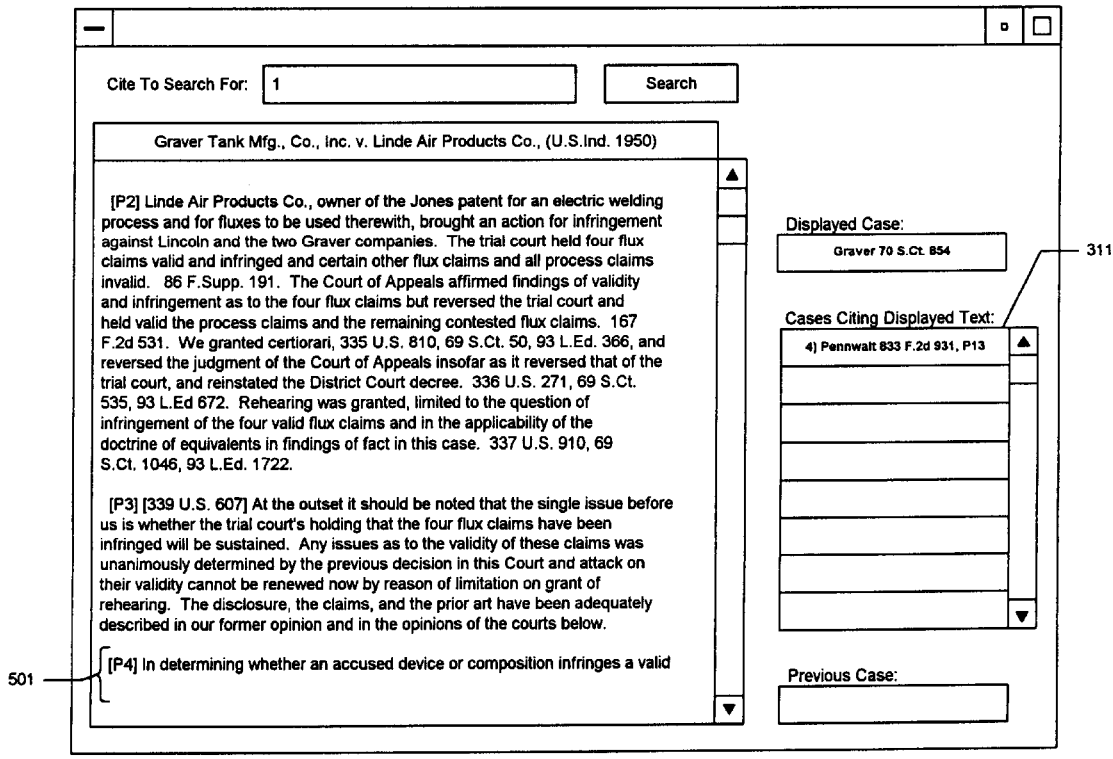
FIG. 5b illustrates the updating of the citing cases box upon scrolling the text of the displayed document.
Figure 5C:
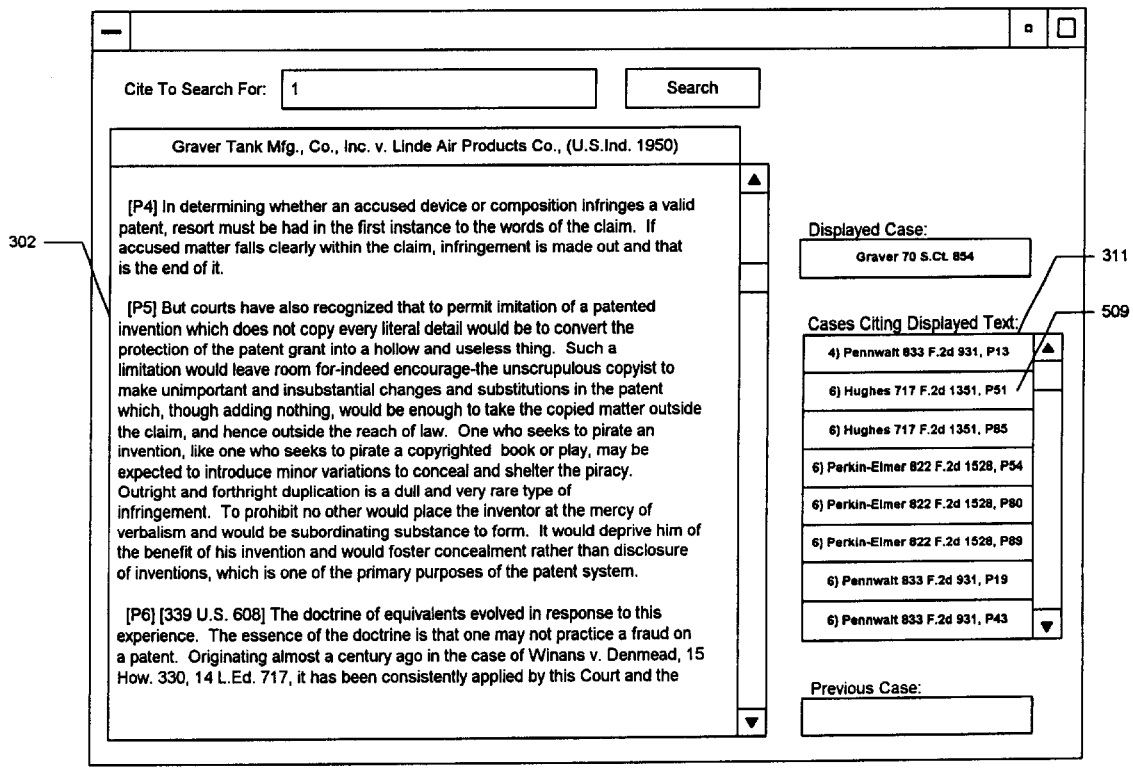
FIGS. 5c and 5d illustrate further updating of the citing cases box.

FIG. 5b shows the display after the user has scrolled down by using the scroll bar 306 so that the first line 501 of the 4th paragraph of the Graver Tank case is displayed in the text box 302. (For convenience, the beginning of each paragraph in the text of cases is marked with the characters "[Pn]," where n is the paragraph number.) In FIG. 5b, the citing cases box 311 is no longer empty. The box 311 contains a representation of the Pennwalt case, which cites paragraph 4 of the Graver Tank case. Thus, the citing cases box in FIG. 5b is periodically (or continually) updated so that it contains only representations of those citing cases that cite the text displayed in the text box 302. In the example shown in FIGS. 5a to 5i, the citing cases box 311 contains representations of cases that cite any paragraph that has at least one line displayed in the text box 302.

Figure 5D:
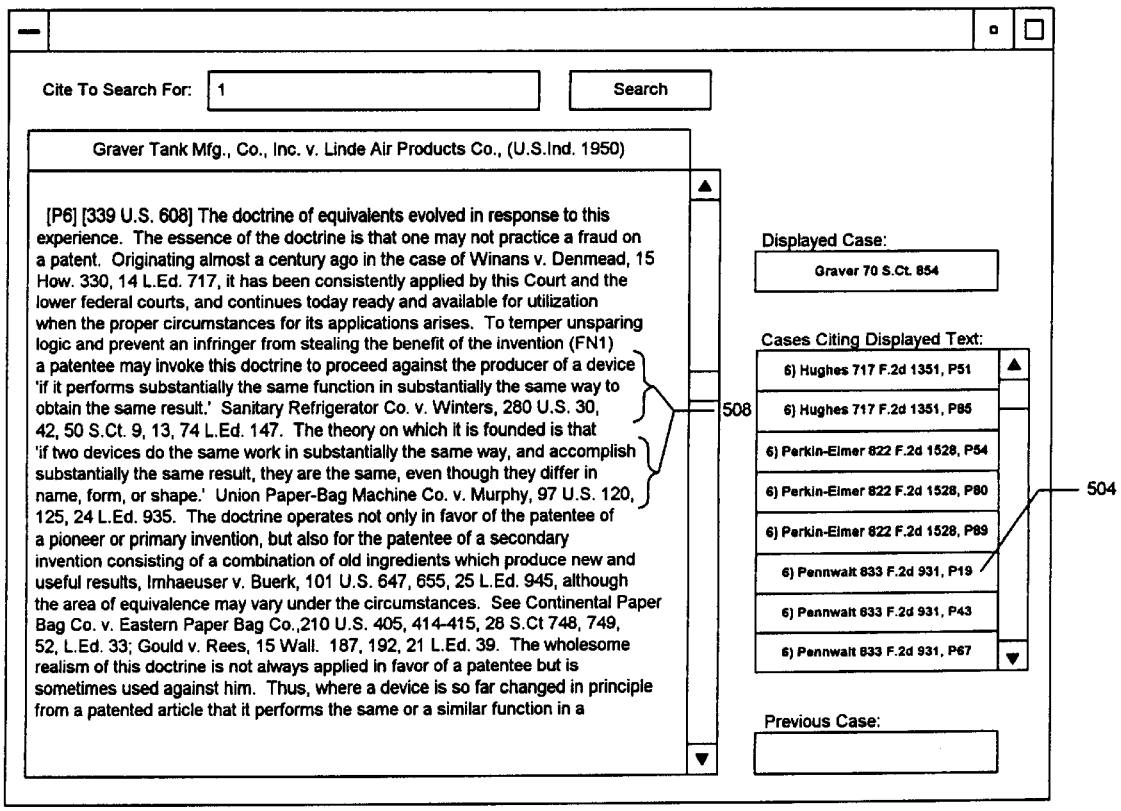

As the user further scrolls through the text of the Graver case, the citing cases box 311 is updated as paragraphs are displayed in the text box 302 and removed from the text box 302. For example, in FIG. 5c, paragraphs four and five of the Graver Tank case are displayed in their entirety, and a portion of paragraph six is displayed in the text box 302. The citing cases box 311 in FIG. 5c therefore contains representations of those citing cases that cite paragraphs four, five, and six of the Graver Tank case. When the user continues to scroll through the text of the Graver Tank case so that, as shown in FIG. 5d, only paragraph six of the Graver Tank case is displayed, and the citing cases box 311 is updated so that only the cases that cite paragraph six of the Graver Tank case are represented in the box 311. Thus, representation 509 (which corresponds to a case citing paragraph four of the Graver Tank case) is in the citing cases box 311 in FIG. 5c, but is removed from the box 311 when paragraph four is no longer in the text box 302 as shown in FIG. 5d.

Figure 5E:
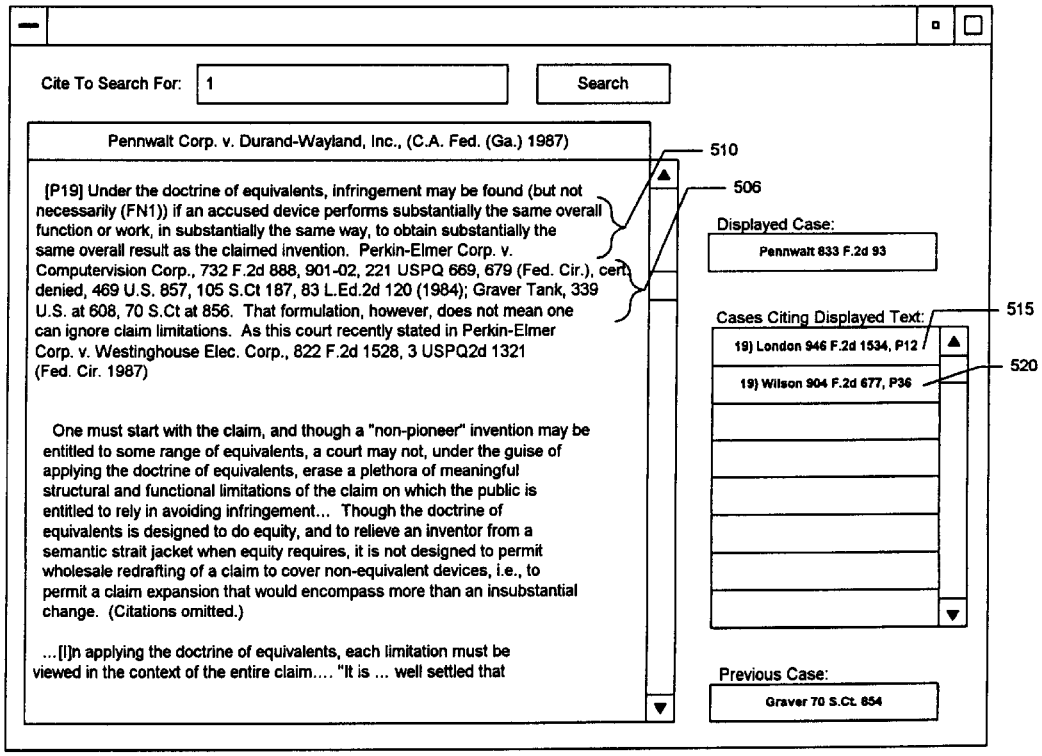
FIG. 5e illustrates the change to the display after selection of one of the representations.

Representation 504 in the citing cases box 311 corresponds to the Pennwalt case, which cites the sixth paragraph of the Graver Tank case. This citation to Graver Tank occurs at the nineteenth paragraph of the Pennwalt case, which is reported beginning at page 931 of volume 833 of the F.2d Reporter series. If the user were to select representation 504 in the citing cases box 311, the display would be updated in the embodiment of FIGS. 5a to 5i so that the citing paragraph in the Pennwalt case (paragraph 19) is displayed in the text box 302 as shown in FIG. 5e. The nineteenth paragraph has been displayed because that is the paragraph that cites the previously displayed 6th paragraph of the Graver Tank case (see FIG. 5d). The citing cases box 311 is updated to contain representations of only those cases that cite the nineteenth paragraph of the Pennwalt case.

At 508 in FIG. 5d, the "function-way-result" doctrine is set forth in paragraph six of the Graver Tank case. The "function-way-result" doctrine is a legal doctrine relating to whether devices perform "substantially the same function in substantially the same way to obtain the same result." See 508 in FIG. 5d. In FIG. 5e, the Graver Tank case has been cited at 506 by the Pennwalt case to support the "function-way-result"doctrine set forth at 510 in paragraph 19 of the Pennwalt case. Thus, paragraph 19 includes a citation to paragraph 6 of the Graver Tank case.

As has been described in connection with FIGS. 5a to 5e, it is possible in the present invention to move directly from the cited case to the position in the citing case where the discussion of the cited case occurs. This ability to move directly from the cited document (Graver Tank) in the example shown to the citing document (Pennwalt) allows the researcher to easily, quickly, and efficiently evaluate the effect of the Pennwalt decision on the legal doctrine set forth in the Graver Tank. This is significant and quite useful because the validity of the law set forth in any case or legal writing can be greatly affected by cases that later evaluate the earlier case. Thus, legal researchers have a need for convenient and efficient access to those cases that discuss specific legal issues decided in any given case. The foregoing procedure satisfies this need, and greatly simplifies legal research.

Figure 5F:
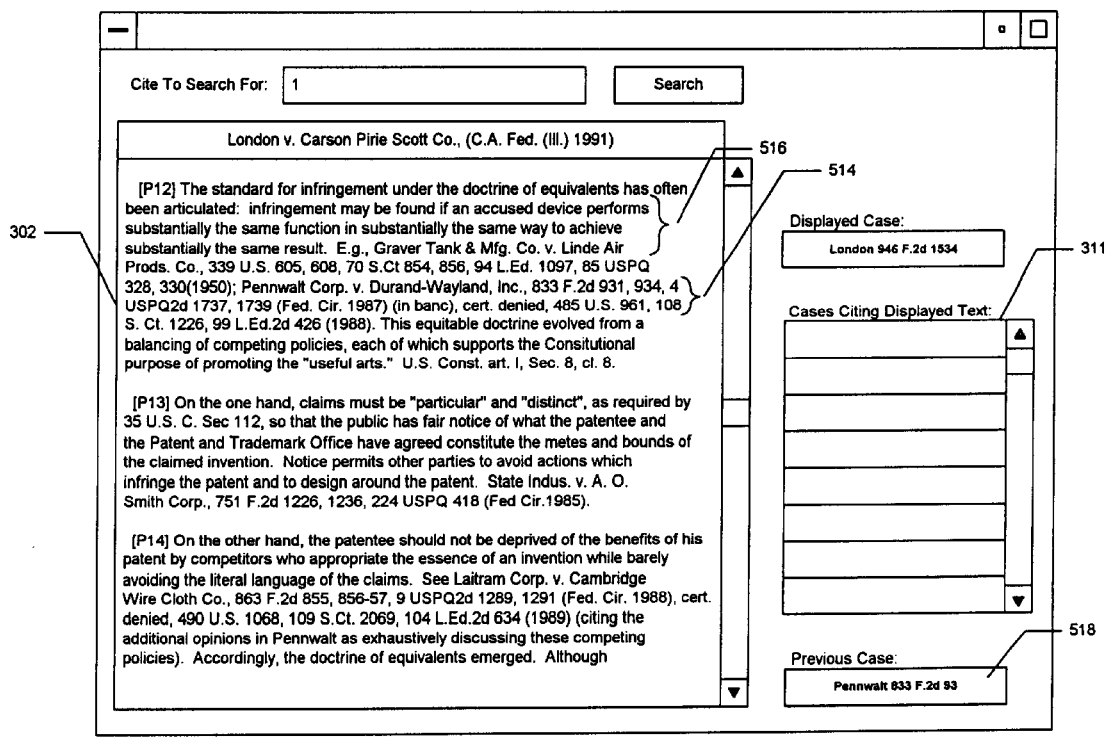
FIG. 5f illustrates the selection of another representation.

FIG. 5e shows an updated citing cases box, this one showing only two representations of citing cases. These cases are the London case and the Wilson case, both of which cite paragraph 19 of the Pennwalt case. When representation 515 is selected, the display is updated to that shown in FIG. 5f which shows paragraph 12 of the London case beginning at the top of the text box 302. Paragraph 12 contains a citation to the previous case, Pennwalt. In FIG. 5f, the citation to the Pennwalt case is shown at 514, and the recitation of the "function-way-result" doctrine is set forth at 516. Thus, the London case cites paragraph 19 of the Pennwalt decision as authority for the "function-way-result" doctrine. No cases within the database cite paragraphs 12, 13, or 14 of the London case, so the citing cases box 311 is empty.

Figure 5G:
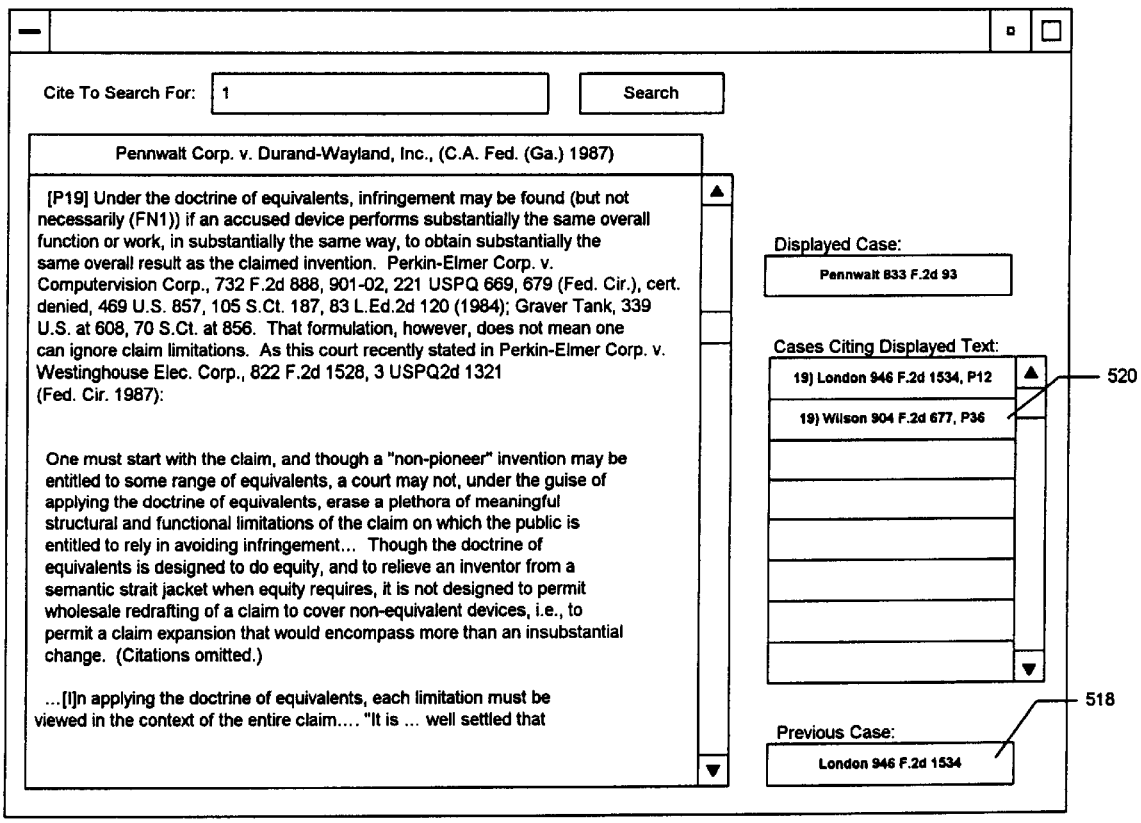
FIG. 5g illustrates the selection of the previous case representation.

The user can backtrack back to the Pennwalt decision by selecting the representation or button 518 shown in FIG. 5f, which updates the text box 302 and the citing cases box 311 to appear just as that shown in FIG. 5e. The previous case representation 518 is updated to correspond to the London case. Thus, the display is as shown in FIG. 5g, which differs from that in FIG. 5e only with respect to representation 518.

Figure 5H:
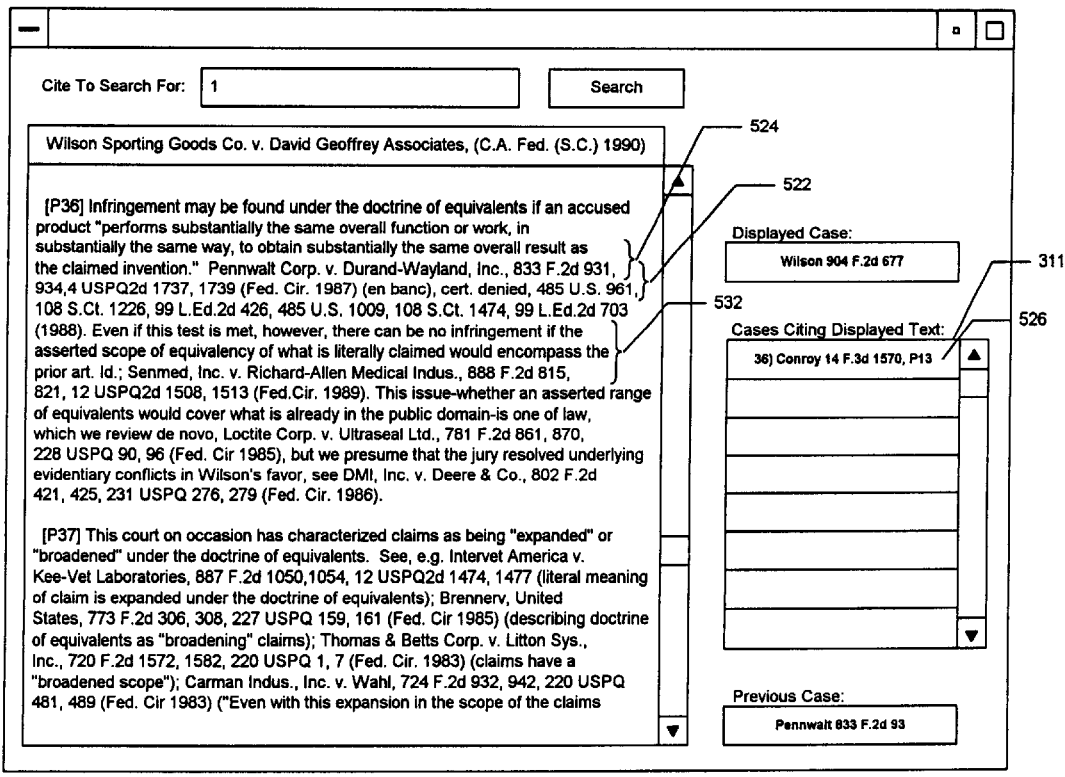
FIGS. 5h and 5i illustrate the further selection of representations of citing cases.

From FIG. 5g, the user again has the opportunity to select the representation for the Wilson case which also cites the paragraph 19 of the Pennwalt decision. By selecting the representation 520 in FIG. 5g, the display is updated as shown in FIG. 5h. Paragraph 36 of the Wilson decision is shown starting at the top of the text box 302 in FIG. 5h. The citation to the Pennwalt decision in paragraph 36 of the Wilson case is indicated at 522. The "function-way-result" doctrine, for which the Pennwalt case is cited, is set forth at 524 of FIG. 5h.

Unlike the London case, there are cases that cite the paragraph of the Wilson case which cites the Pennwalt case. Therefore, the citing cases box 311 in FIG. 5h is not empty. When representation 526 in the citing cases box 311 is selected, the display is updated to that shown in FIG. 5i.

Figure 5I:
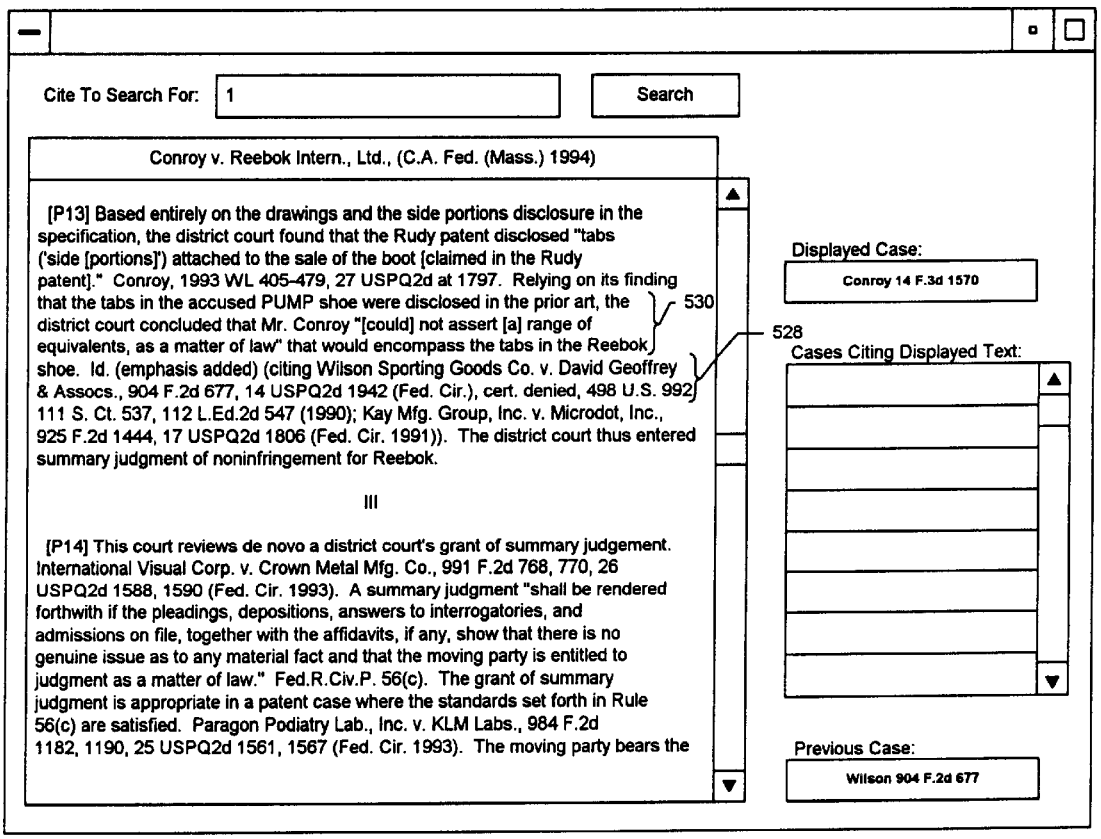

FIG. 5i shows the updated display with the text box showing paragraph 13 of the Conroy decision, and the citation to the Wilson case at 528. However, the doctrine for which the Wilson case is being relied upon is different than the "function-way-result" doctrine that has been traced from the Graver Tank decision. At 532 of FIG. 5h, the Wilson case sets forth the proposition that "there can be no infringement if the asserted scope of equivalency of what is literally claimed would encompass the prior art." This is the proposition for which the Conroy case is citing paragraph 36 of Wilson decision. The law cited in paragraph 36 of Wilson case is applied at paragraph 530 of FIG. 5i.

Figure 6:
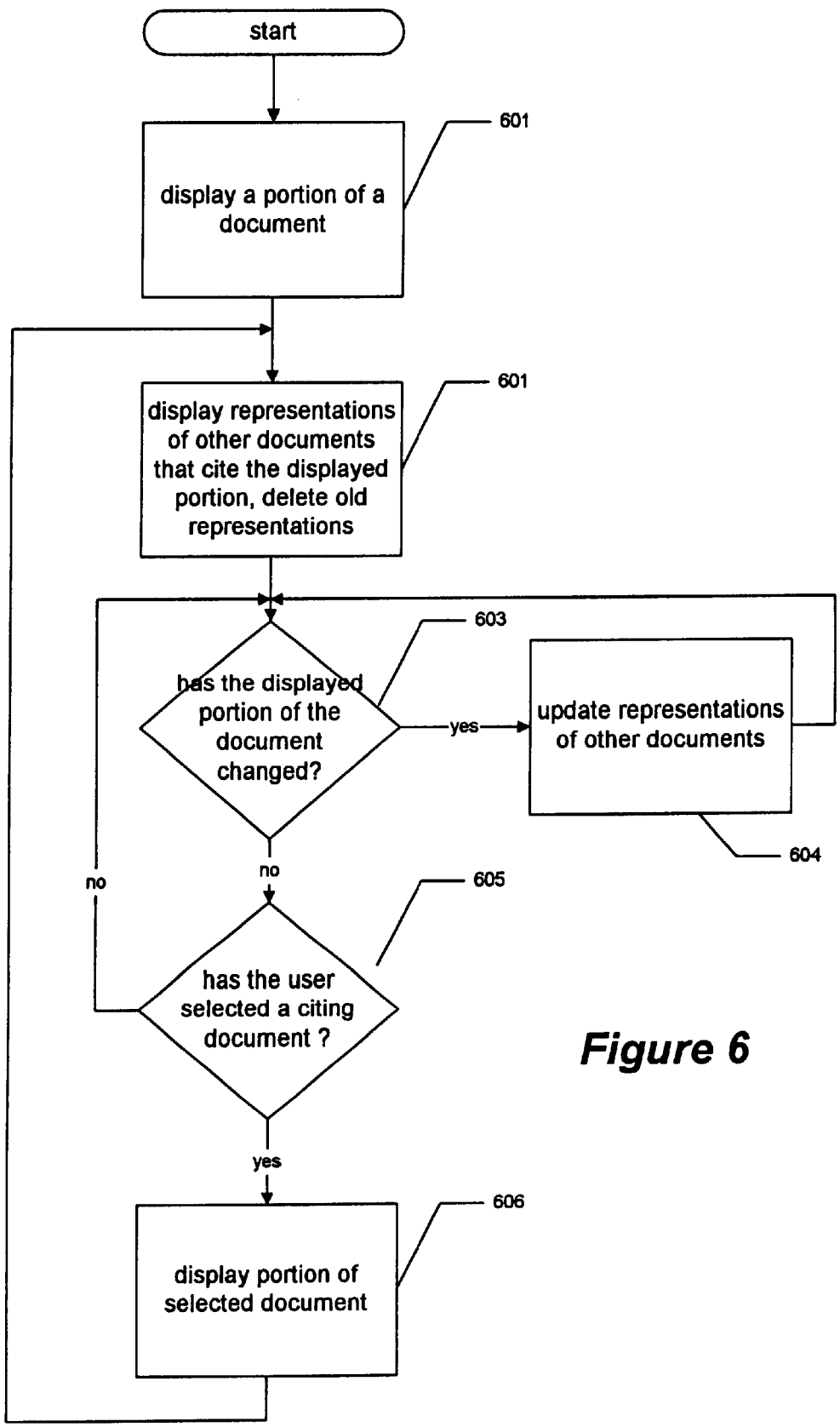
FIG. 6 is a flow diagram of process steps similar to that carried out in connection with FIGS. 5a to 5i.

FIG. 6 is a flow chart of steps carried out by an embodiment of the present invention that is similar to that described in connection with FIGS. 5a to 5i, where step 601 displays a portion of a document, and step 602 displays in the citing cases box only those representations of citing documents that cite the displayed portion from step 601. The user is continually monitored to determine at 603 whether the displayed text has changed (e.g., by virtue of the user scrolling the display text). If the text has changed, the representations of the citing cases are updated at 604. The user is also monitored at 605 to determine whether a citing document has been selected. When a citing document is selected, the display is updated to show a portion of the selected document. At step 602, restarting the procedure, the citing cases box is also updated to contain representations of citing cases that cite the newly displayed text.

FIGS. 7a to 7d show an alternate embodiment of the present invention that is similar to the embodiments shown in connection with FIGS. 5a to 5i and the flow chart of FIG. 6. The embodiment of FIGS. 7a to 7d differs from other embodiments in that representations of citing cases remain in the citing cases box after the display has been updated. In the previously-described embodiments, the citing cases that no longer correspond to the text shown on the display are removed from the citing cases box.

Figure 7A:
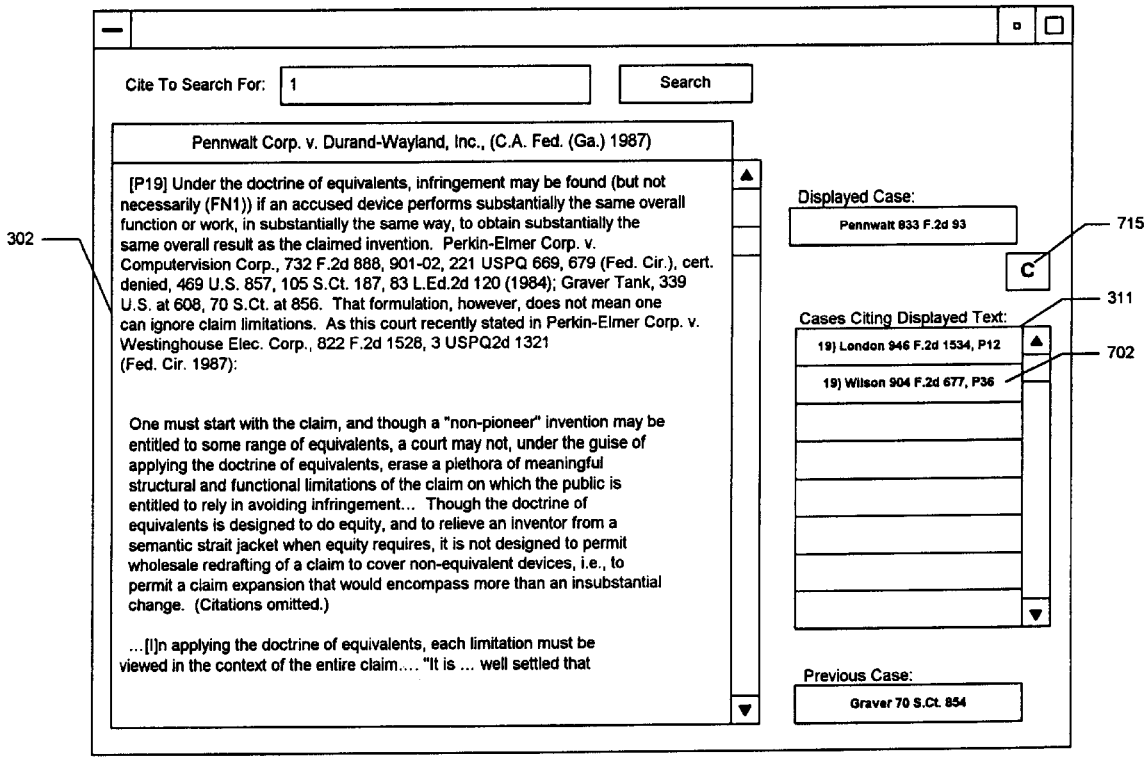
FIG. 7a is a view of a screen on which the text of a document is displayed, and representations of citing documents are also displayed.
Figure 7B:
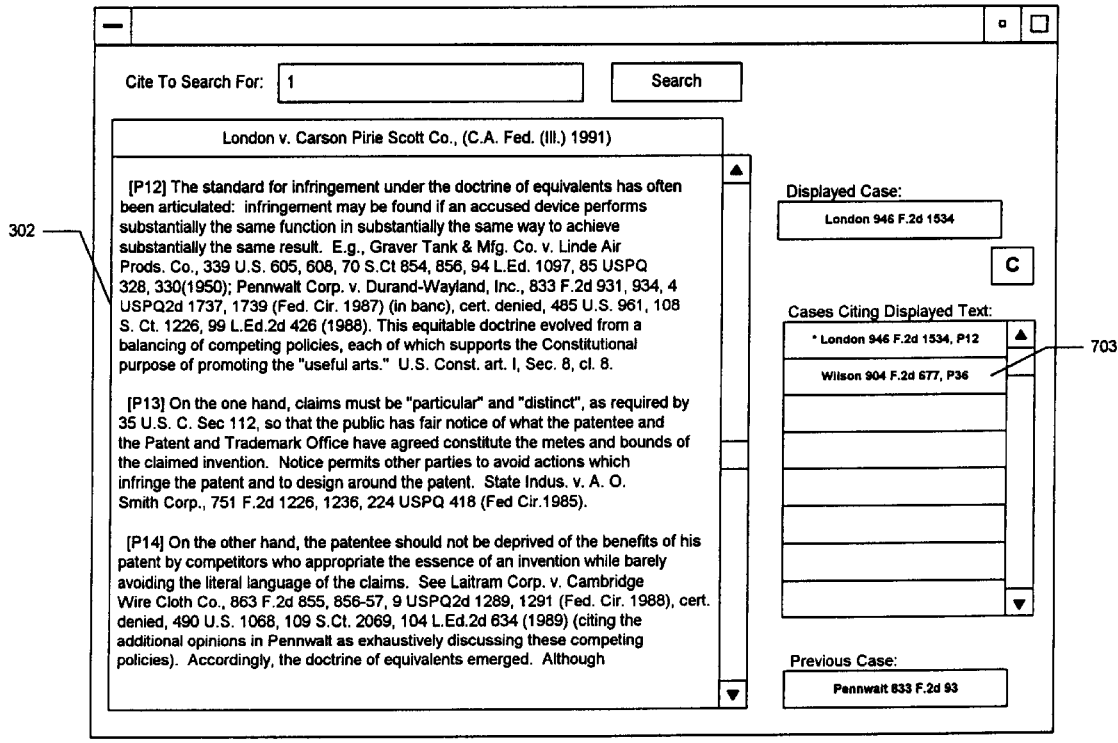
FIG. 7b illustrates the retention of representations of previous citing cases in the citing cases box.

In FIG. 7a, the Pennwalt decision is shown with paragraph 19 of that decision shown in the text box 302. Representations of two citing cases (London and Wilson), are shown in the citing cases box 311. Both London and Wilson cite paragraph 19 of the Pennwalt decision. When the user selects representation 702 in the citing cases box, the display is updated as shown in FIG. 7b. The text box 302 in FIG. 7b shows paragraph 12 (and 13 and 14) of the London decision. Unlike previous embodiments, however, the representations of the London and the Wilson cases remain in the citing cases box 311.

Retaining representations of citing cases in the citing cases box 311 allows the user to collect an list of relevant cases by traversing a number of linked cases. This is important because the user may otherwise have to remember or come back to the cases that he or she initially decides not to examine. This situation is illustrated in FIGS. 5e to 5h, where it was necessary to backtrack from the London case (FIG. 5f) back to the Pennwalt case (FIG. 5g), and then to the Wilson case (FIG. 5h) to display all of the cases that cite paragraph 19 of the Pennwalt case (see FIG. 5e, and previous discussion). By retaining representations of citing cases, such a procedure is unnecessary. In FIG. 7b, the Wilson case can be displayed at any time upon selection by the user of representation 703, even when Wilson does not cite the displayed document.

Figure 7C:
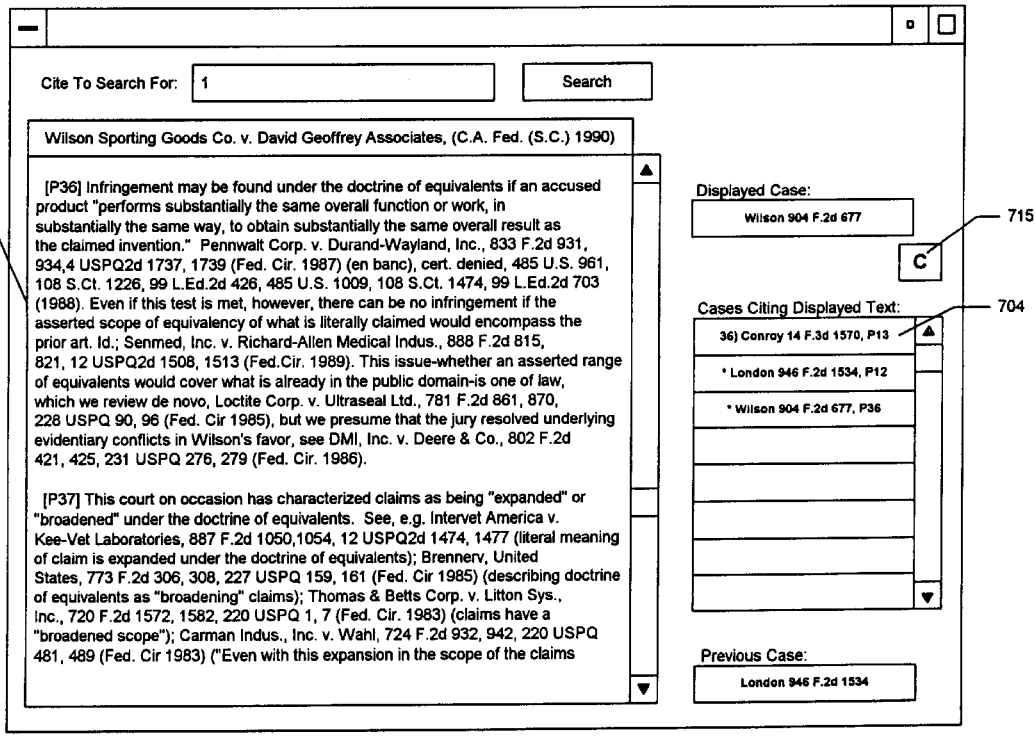
FIG. 7c further illustrates the retention of representations of previous citing cases in the citing cases box.
Figure 7D:
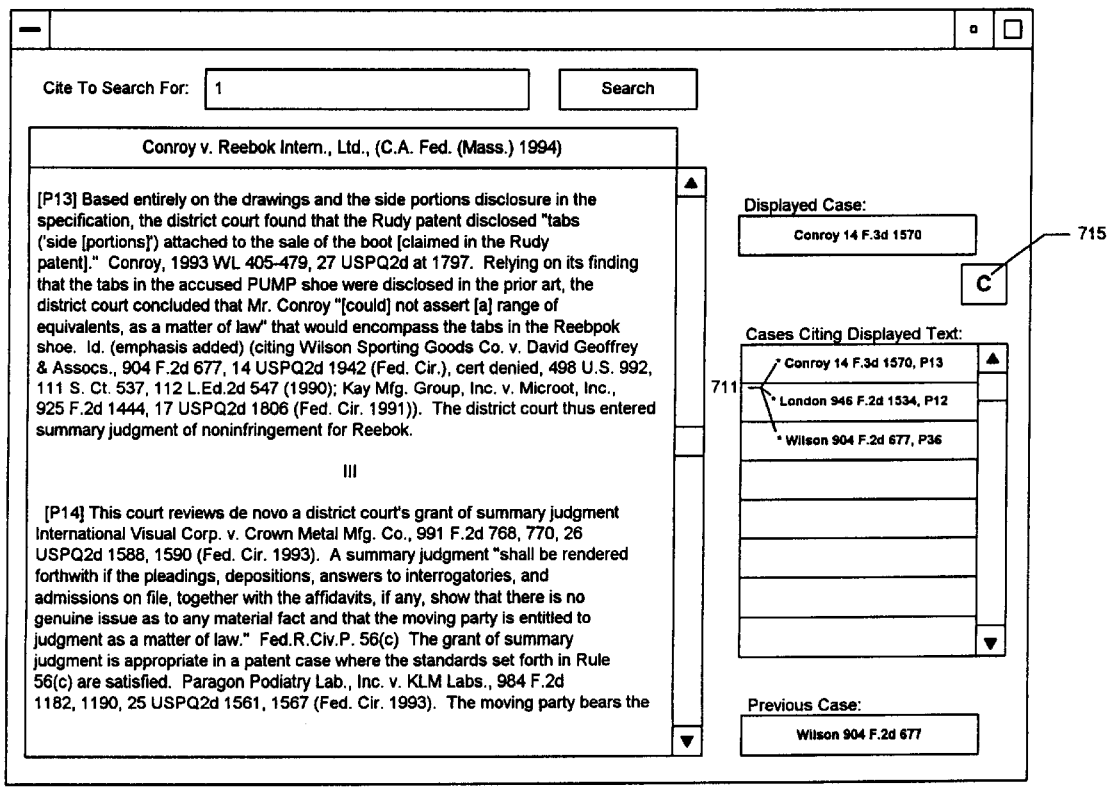
FIG. 7d illustrates and points out markers or highlighting that is used to indicate which representations have already been displayed.

FIG. 7c shows the updated display after representation 703 is selected in FIG. 7b. The citing cases box 311 of FIG. 7c shows an additional representation in the citing cases box 311 corresponding to the Conroy case, which cites the displayed paragraph 36 of the Wilson decision. When the representation 704 is selected, the display is updated as shown in FIG. 7d. As shown in FIG. 7d, representations of the Conroy, Wilson and London cases are still shown in the cited cases box.

The displays of FIGS. 7a through 7d have a clear button 715 that is used to clear the citing cases box 311 of all representations of citing cases. This permits the user to start collecting citing cases from scratch at any given point during research. FIGS. 7b to 7d also show a highlight or marker 711 that indicates which representations have already been displayed. Highlighting in this manner allows the user to determine, by looking at each representation, those which he or she has already studied or already displayed. Such highlighting therefore provides a means by which the user will know when he or she has looked at all of the citing cases. Highlighting can be done as shown in FIG. 7d by placing a marker on or next to each representation, or highlighting can also be done by changing the color of the representation, by changing the font, or by any other manner that makes it clear which cases have been viewed and which cases have not. Similarly, in another embodiment, it may be desirable to remove from the citing cases bin the cases that have already been viewed by the user.

Figure 8:
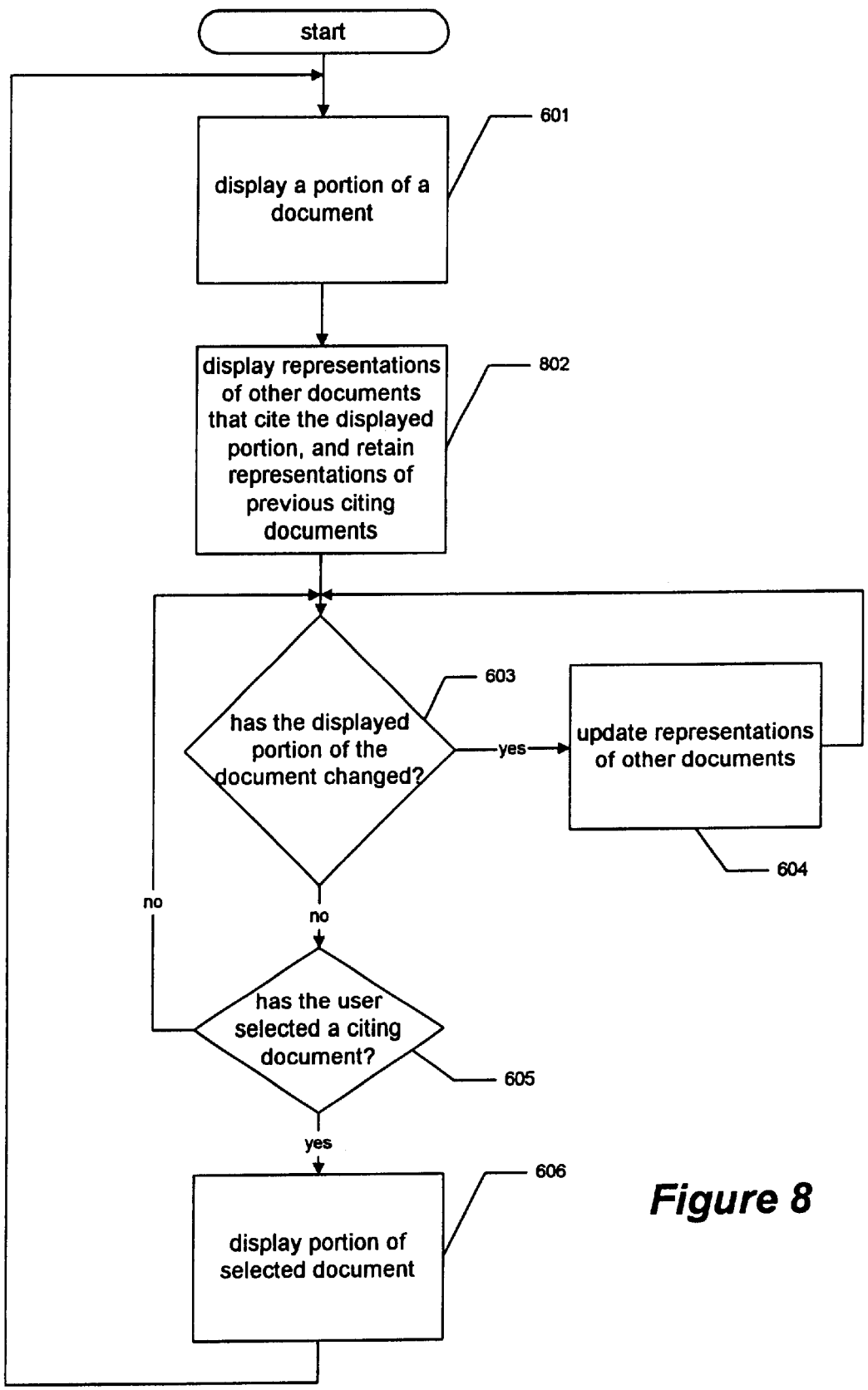
FIG. 8 is a flow diagram of process steps similar to that carried out in connection with FIGS. 7a to 7d.

FIG. 8 shows a flow chart that is very similar to that of the flow chart in FIG. 6 and also is similar to the embodiment shown in connection with FIGS. 7a to 7d. The flow chart in FIG. 8 differs from that of FIG. 6 only in that step 802 involves retaining the representations of the previous citing documents, whereas the corresponding step 602 in FIG. 6 does not retain the previous representations.

Figure 9A:
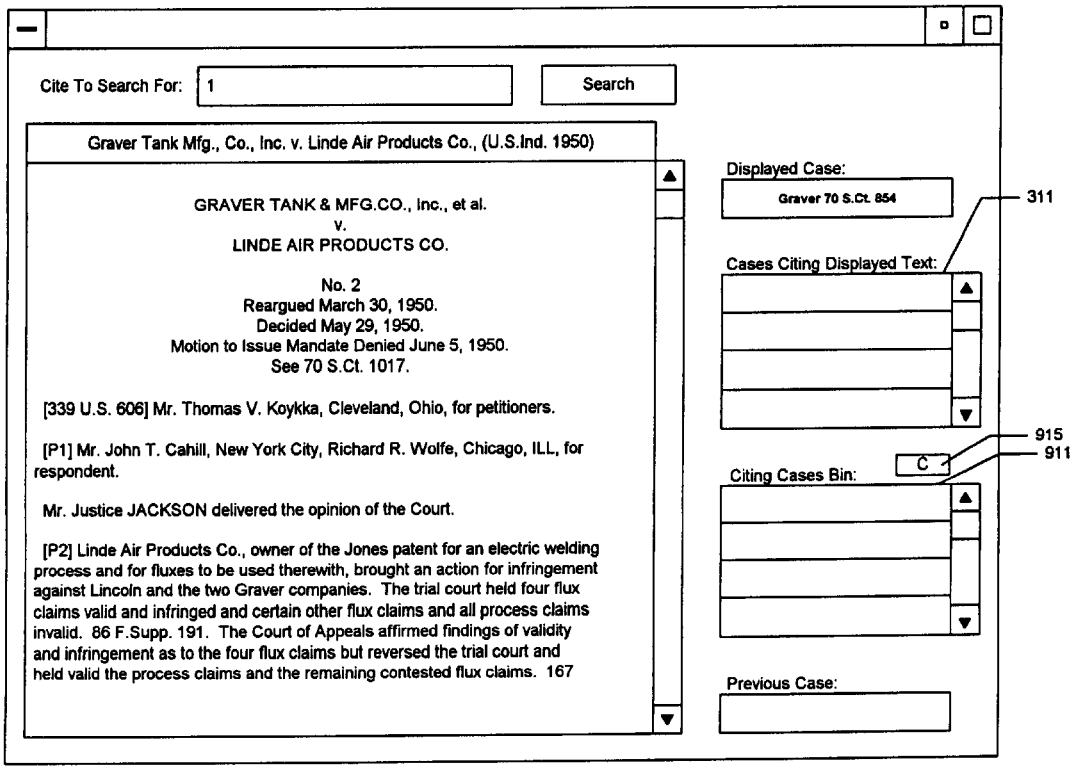
FIG. 9a is a view of a screen on which the text of a document is displayed, as well as a citing cases box and a citing cases bin.
Figure 9B:
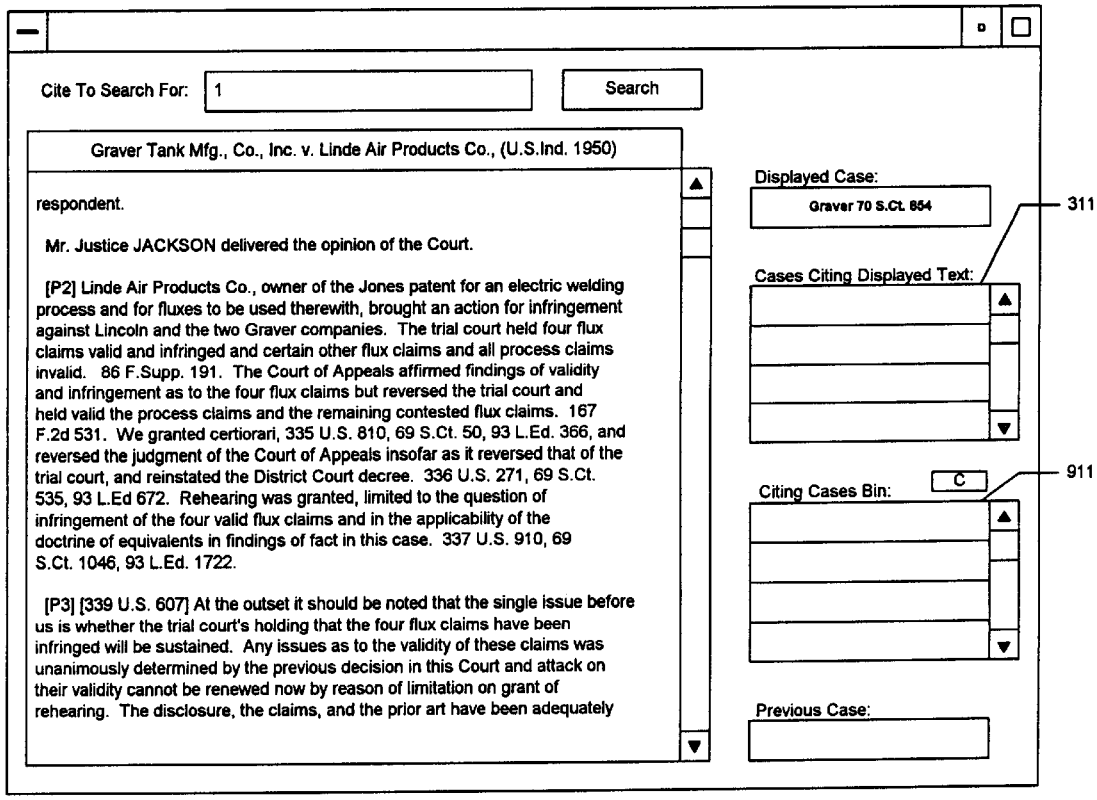
FIG. 9b is a view of the screen of FIG. 9a after the user has scrolled the text of the document.

Another embodiment of the present invention is shown in connection with FIGS. 9a to 9d. This embodiment demonstrates that it is possible to keep a separate bin of citing cases in which to retain all of the cases that have previously been cited. For example, in FIG. 9a, the first portion of the text of the Graver Tank case is shown. In FIG. 9b, the user has scrolled through the text of the Graver Tank case for a few lines. There do not happen to be any cases that cite the displayed text of the FIGS. 9a or 9b, so the citing cases box 311 is empty in both situations.

Figure 9C:
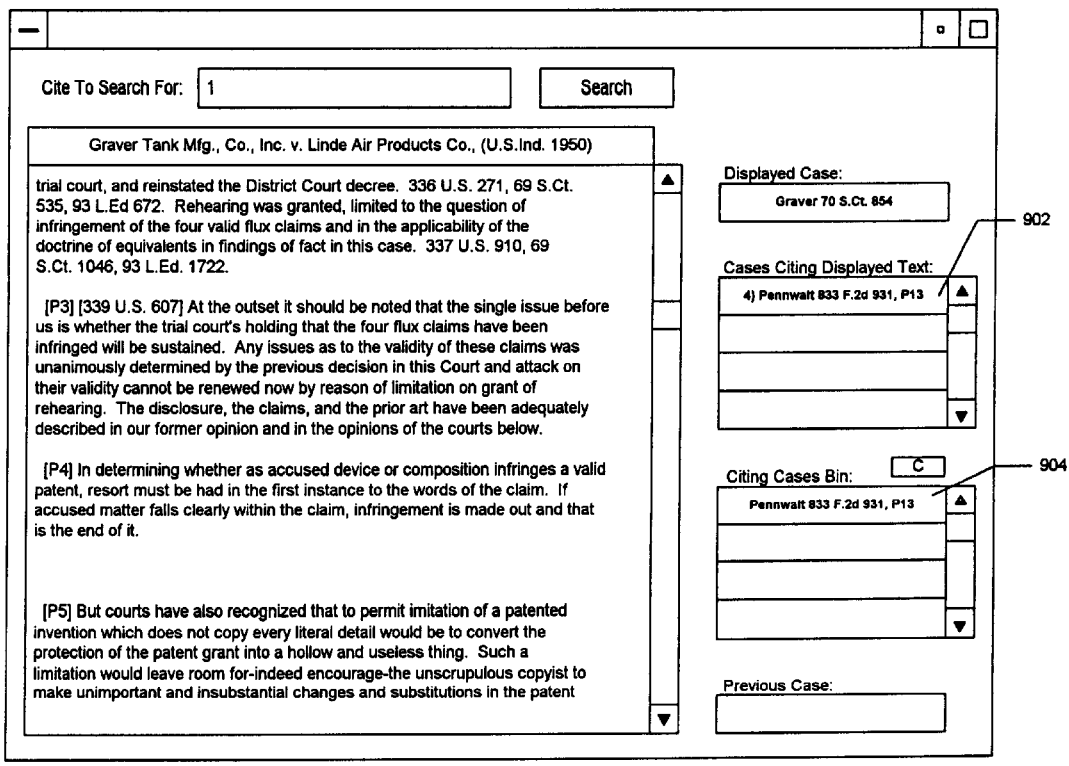
FIG. 9c illustrates the updating of the citing cases box and the citing cases bin when the text of the displayed document is scrolled.
Figure 9D:
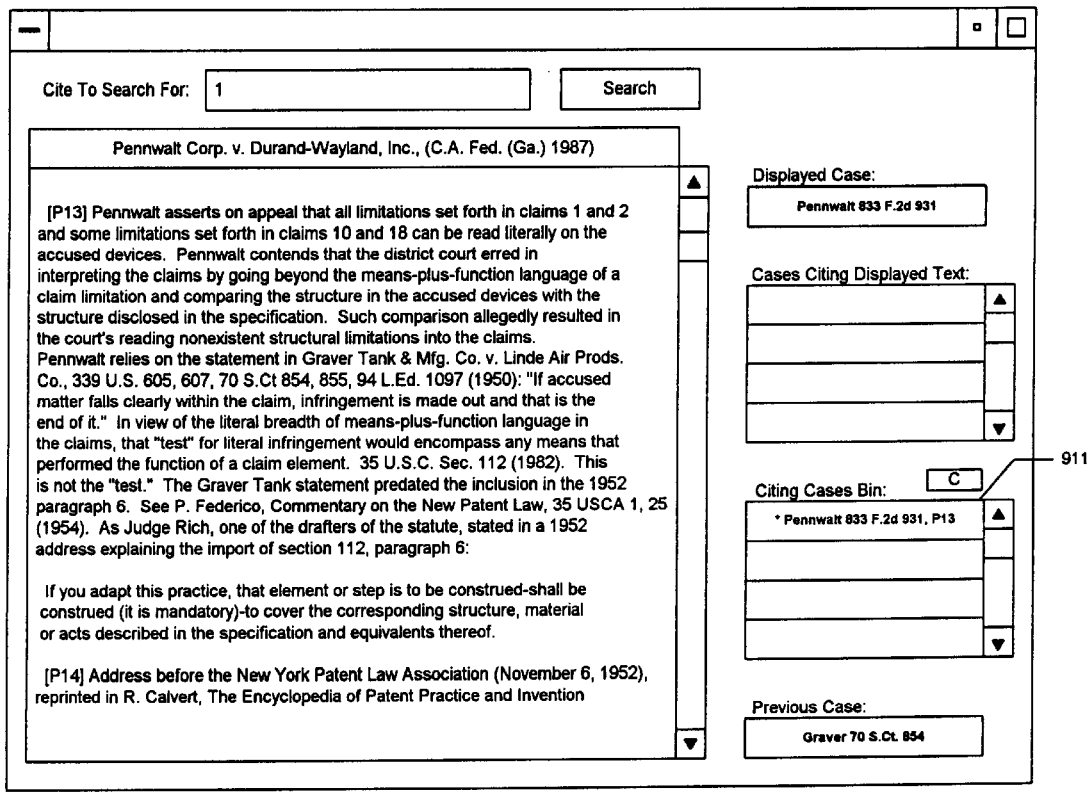
FIG. 9d illustrates the updating of the display upon selection by the user of a representation of a citing case.

In FIG. 9c, the user has scrolled down somewhat so that portions of paragraphs two through five of the Graver Tank case are displayed. The Pennwalt decision cites paragraph 4 of the Graver Tank case, so a representation of the Pennwalt case is displayed in the citing cases box 311, and also in the citing cases bin 911. When the user selects the representation 902 (or alternatively, 904), the Pennwalt decision is displayed as shown in FIG. 9d and the citing cases box 311 is emptied because no cases (in the database) cite paragraph 13 of the Pennwalt decision. The citing cases bin 911, however, retains the representation of the previously cited case.

The embodiment of FIGS. 9a to 9c operates very similar to that of FIGS. 7a to 7d, the difference being that all cases are retained in the citing cases bin 911, and the citing cases box 311 only contains those cases that cite the currently displayed text.

In another embodiment, a citing cases bin similar to that described in connection with FIGS. 9a to 9c could contain all of the representations of cases that cite the displayed case, rather than previous representations. In other words, representations for all of the cases that cite the displayed case could be listed in the citing cases bin 911, but the citing cases box 311 could be used for only those representations of cases that cite the text displayed in the text box 302. This division or arrangement could effectively convey to the user which citing cases cite the displayed text, and which citing cases cite some other portion of the displayed case.

Figure 10A:
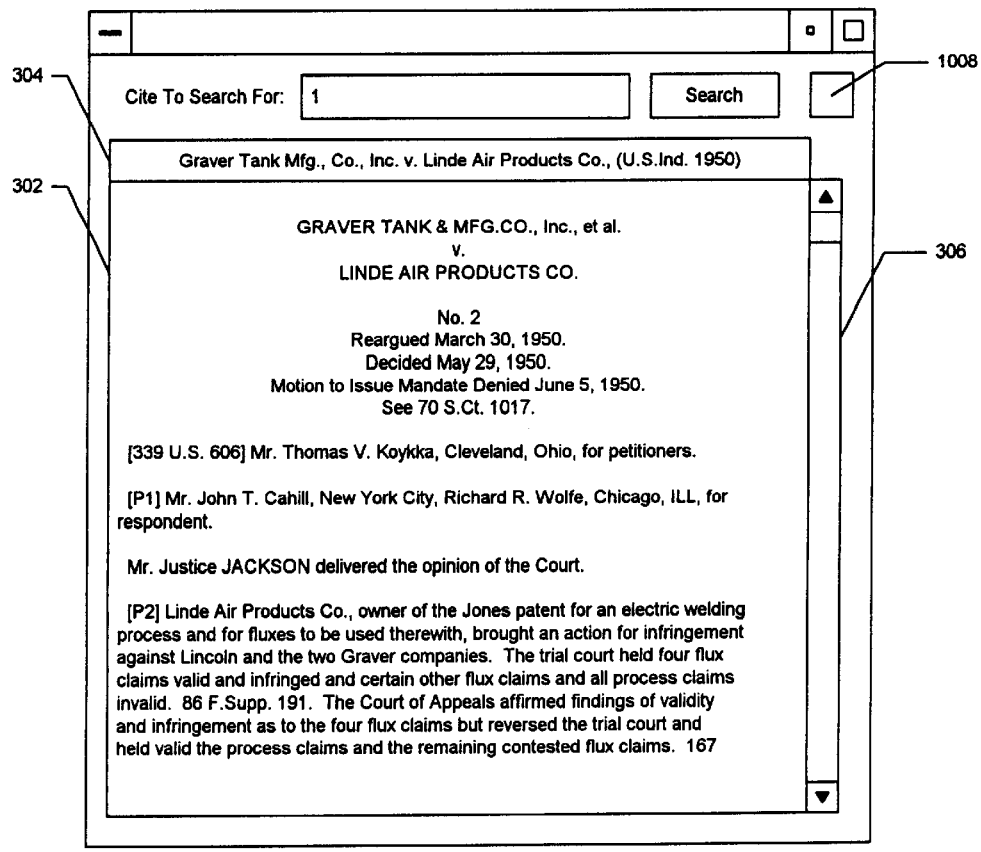
FIG. 10a is a view of a screen in another embodiment of the present invention, in which the text of a document is displayed.

FIGS. 10a to 10f illustrate yet another embodiment of the present invention in which the citing cases box 311 is not displayed on the same screen or simultaneously with the text box 302 that contains the text of the displayed case. In FIG. 10a, for example, the text box 302 shows the Graver Tank opinion, and the title box 304 shows the title of the Graver Tank opinion. The scroll bar 306 allows the user to scroll through the Graver Tank opinion in the manner known in the art.

Figures 10B, 10C:
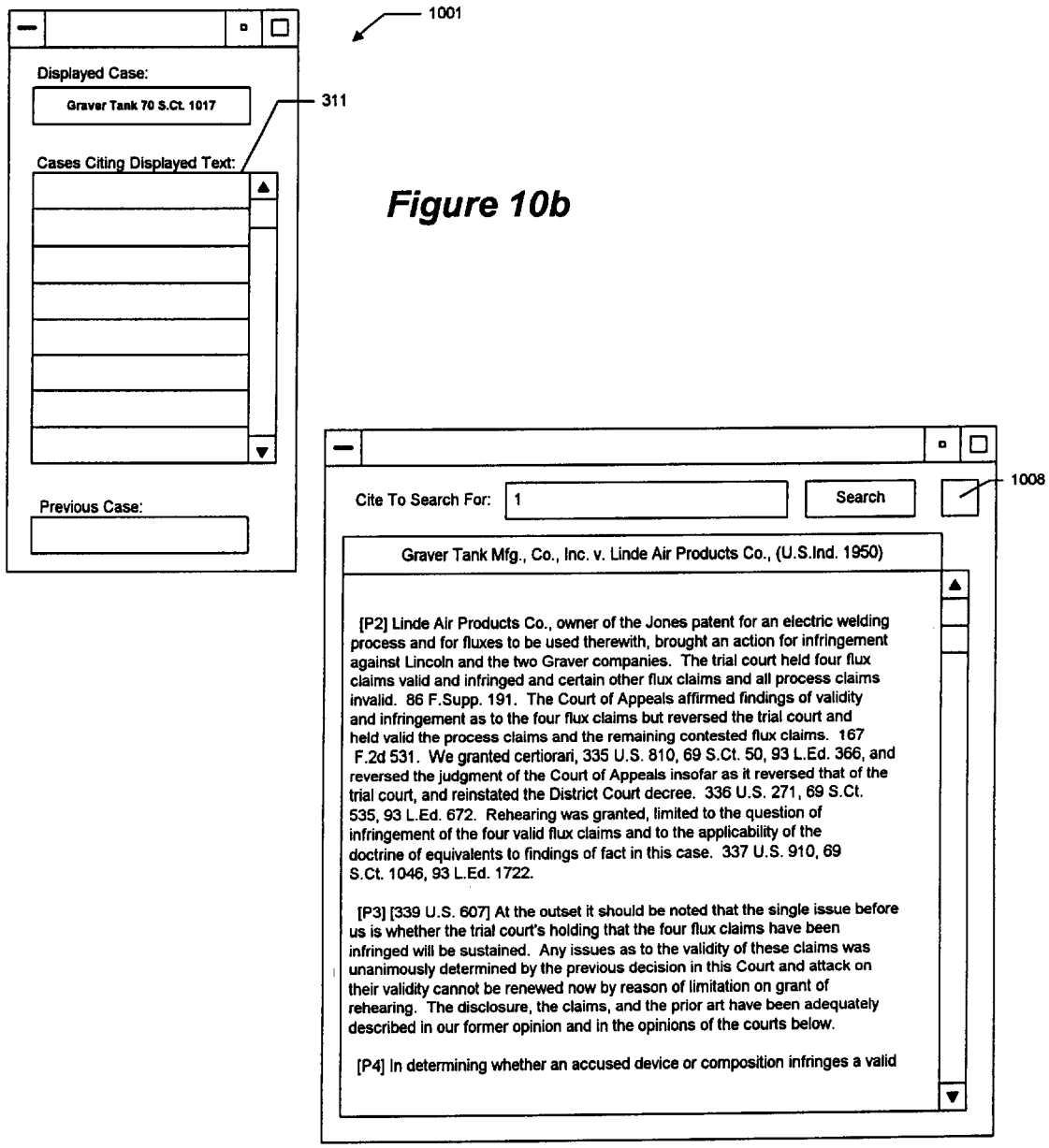
Figure 10D:
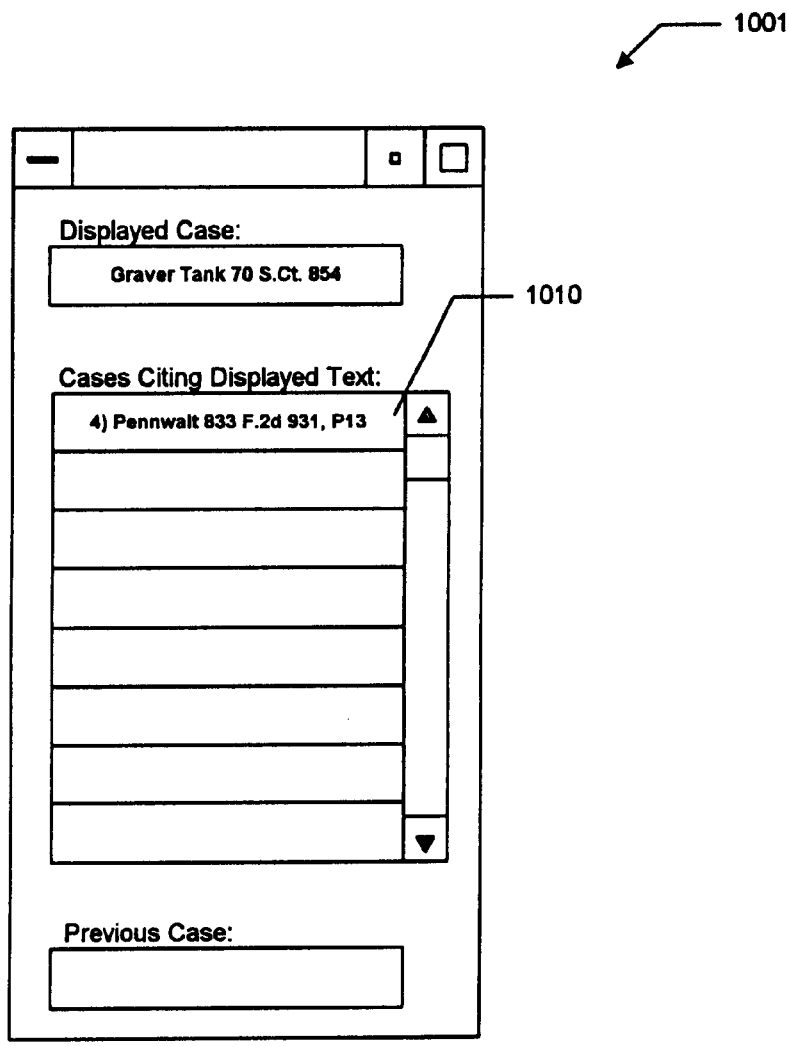
FIG. 10d illustrates how the window of FIG. 10b would be updated upon the scrolling of the text as shown in FIG. 10c.
Figure 10E:
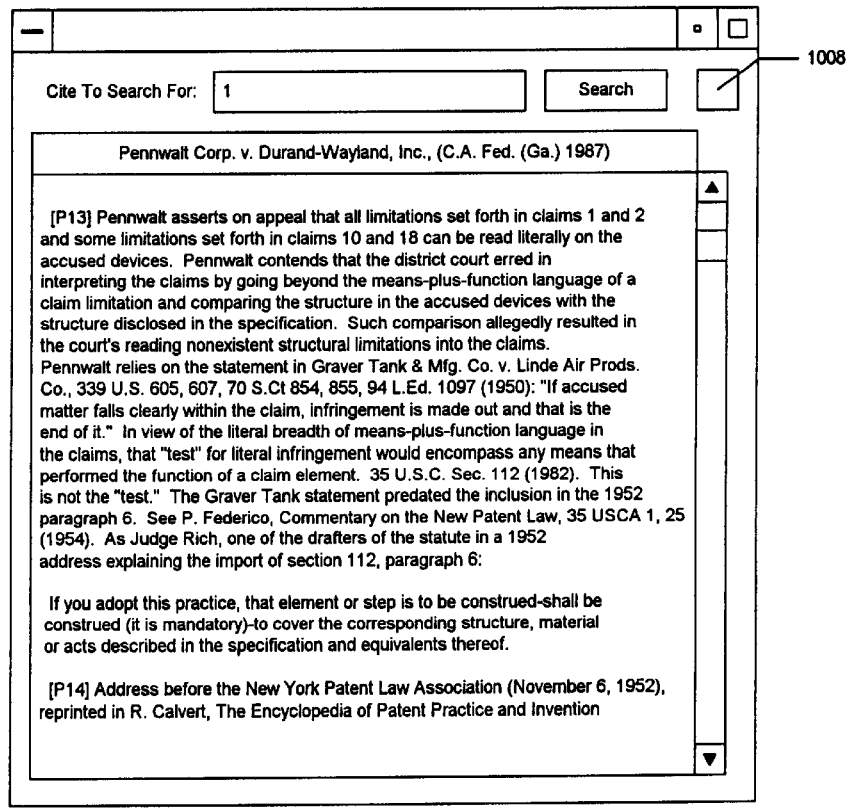
FIG. 10e illustrates the selection of one of the representations of citing cases in FIG. 10d.

The citation button 1008 allows the user to bring up a window 1001 such as that shown in FIG. 10b. This window contains a citing cases box 311, which lists the representations of the cases citing the text displayed in the text box of FIG. 10a. There are no cases that cite the text displayed in FIG. 10a, so citing cases box 311 in FIG. 10b is empty. However, this changes as the user scrolls down through the text in the manner shown in FIG. 10c. The window 1001 that is brought up upon selection of the button 1008 in FIG. 10c is shown in FIG. 10d. The citing cases box 311 in FIG. 10d shows includes a representation of the Pennwalt case. As in the embodiments described above, the user can select a representation in the citing cases box 311. When the representation 1010 is selected in FIG. 10d, the Pennwalt decision is displayed as shown in FIG. 10e.

Figure 10F:
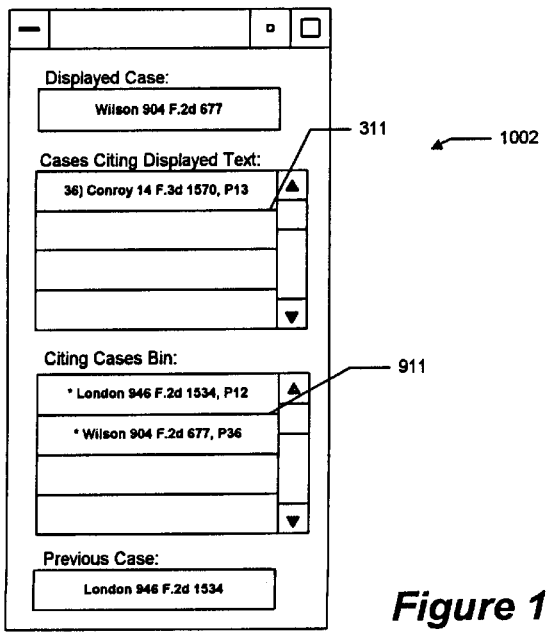
FIG. 10f illustrates a window that could be employed in alternative embodiment of the present invention.

FIG. 10f shows a window 1002 which can be used as an alternative to that shown in FIG. 10b. The window 1002 has a citing cases box 311 and a citing cases bin 911, which operate in a manner similar to that described in connection with FIGS. 9a to 9d.

FIGS. 10a to 10f describe embodiments in which the text of a case and the representations of citing documents are not displayed simultaneously. Rather, when button 1008 is selected, window 1001 (or in an alternative embodiment, window 1002) is shown on the display. The window 1001 may completely displace showing the text of the cited case, or it may only partially obstruct the displayed text of the cited case.

Figure 11:
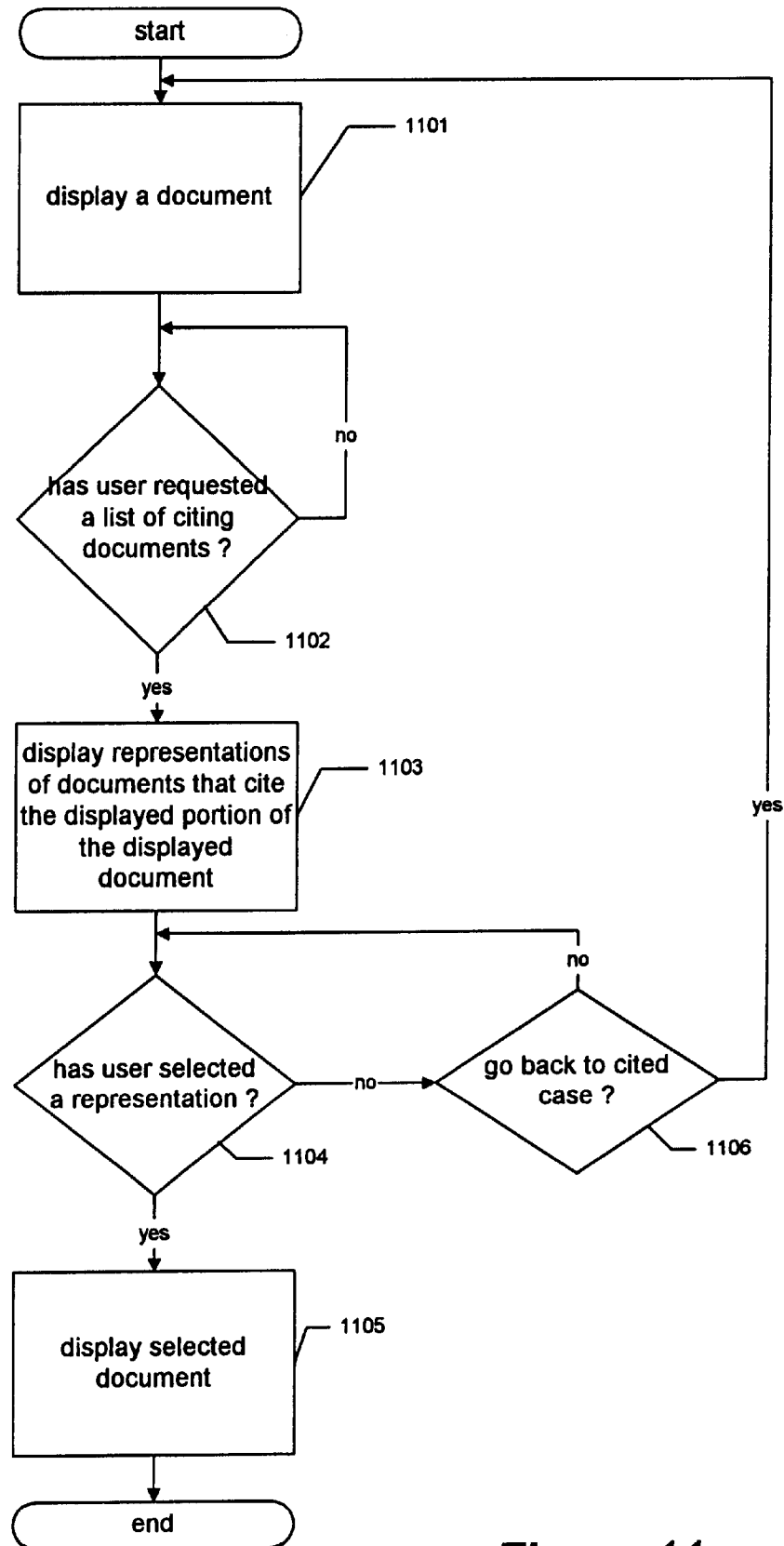
FIG. 11 is a flow diagram of process steps similar to that carried out in connection with FIGS. 10a to 10e.

FIG. 11 is a flow chart that is similar to the embodiment described in connection with FIGS. 10a to 10f. Step 1101 simply involves displaying a portion of a document. In step 1102, the user is monitored to determine whether he or she has requested a list of cites (e.g., by selecting the button 1008 in FIG. 10a). If so, representations of cases citing the displayed text are displayed in step 1103. The user then may select one of the representations in step 1104, and if this is done, a portion of the document corresponding to the selected document is displayed at step 1105. Alternatively, the user may choose to go back to the cited case, or in other words, display the text of the cited case that was displayed at step 1101. See step 1106.

Figure 12A:
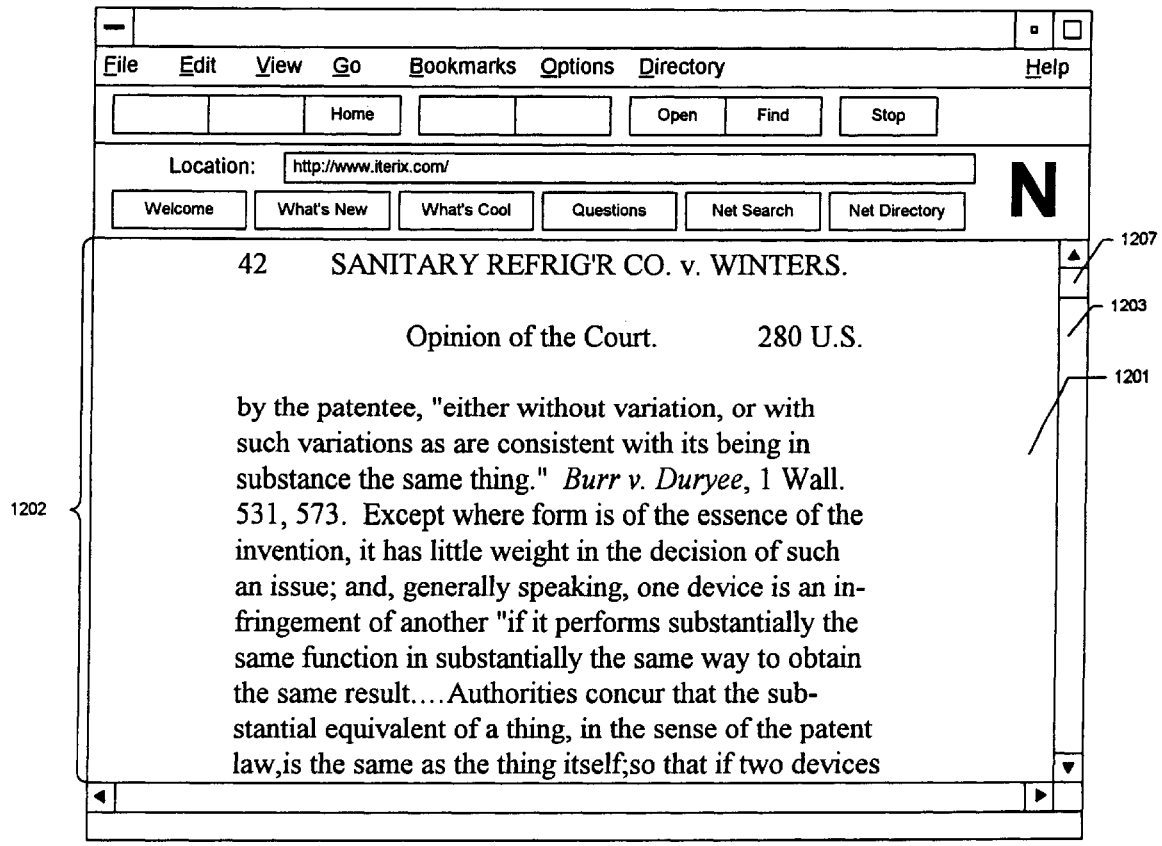
FIG. 12a is a view of a web page in an internet-based implementation of the present invention.

FIGS. 12a to 12f illustrate an embodiment of the present invention that has been implemented on the Internet's World Wide Web. FIG. 12a shows a web page displayed in the browser available from Netscape Communications Corp. The web page 1201 shown in FIG. 12a corresponds to page 42 of volume 280 of the U.S. Reports series. This page is part of the 1929 U.S. Supreme Court decision of Sanitary Refrigerator Co. v. Winters. The Sanitary Refrigerator case starts on page 30 of volume 280 of the U.S. Reports. In the World Wide Web implementation of FIGS. 12a to 12f, one or more web servers of the type known well in the art are connected to the Internet. For simplicity, each web page corresponds to the paper pages in the actual bound U.S. Reports. Thus, the web server has a web page for each page within each volume of the U.S. Reports.

Figure 12B:
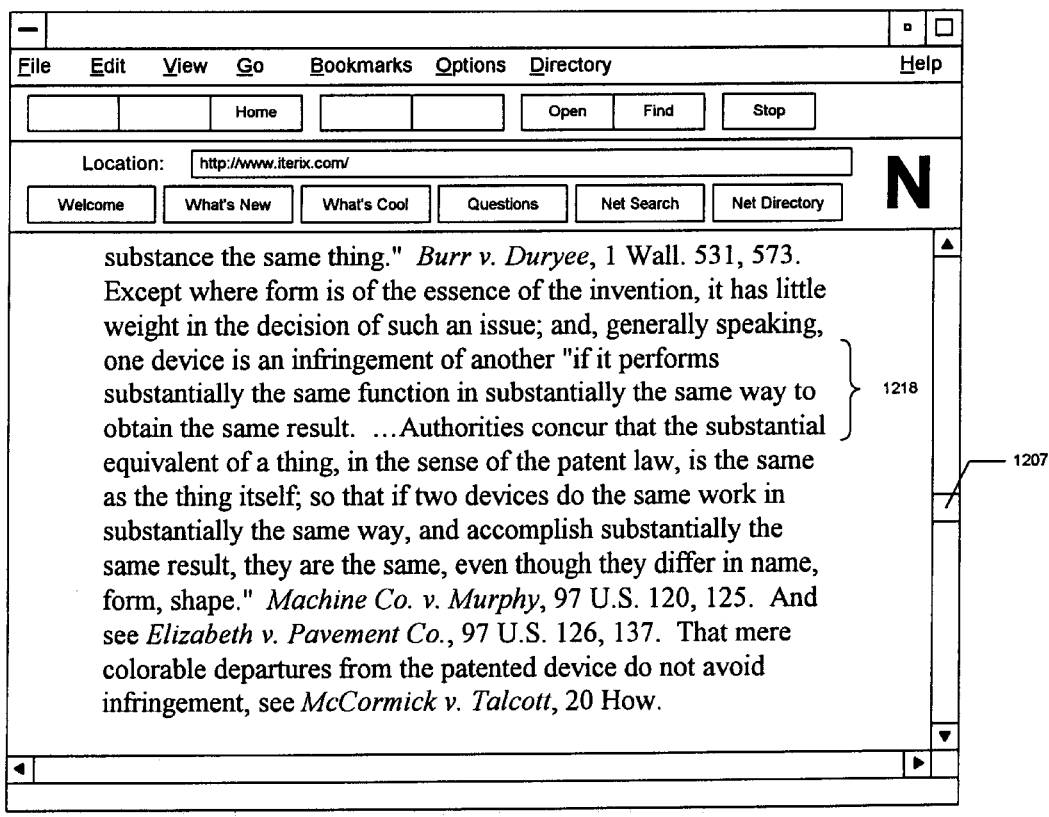

Depending on the user's web browser and hardware, some or all of the web page 1201 will be displayed in the browser display 1202. The scroll bar 1203 allows the user to scroll through the web page. FIG. 12b shows the middle portion of the web page, which is displayed when the scroll box 1207 is moved as shown.

Figure 12C:
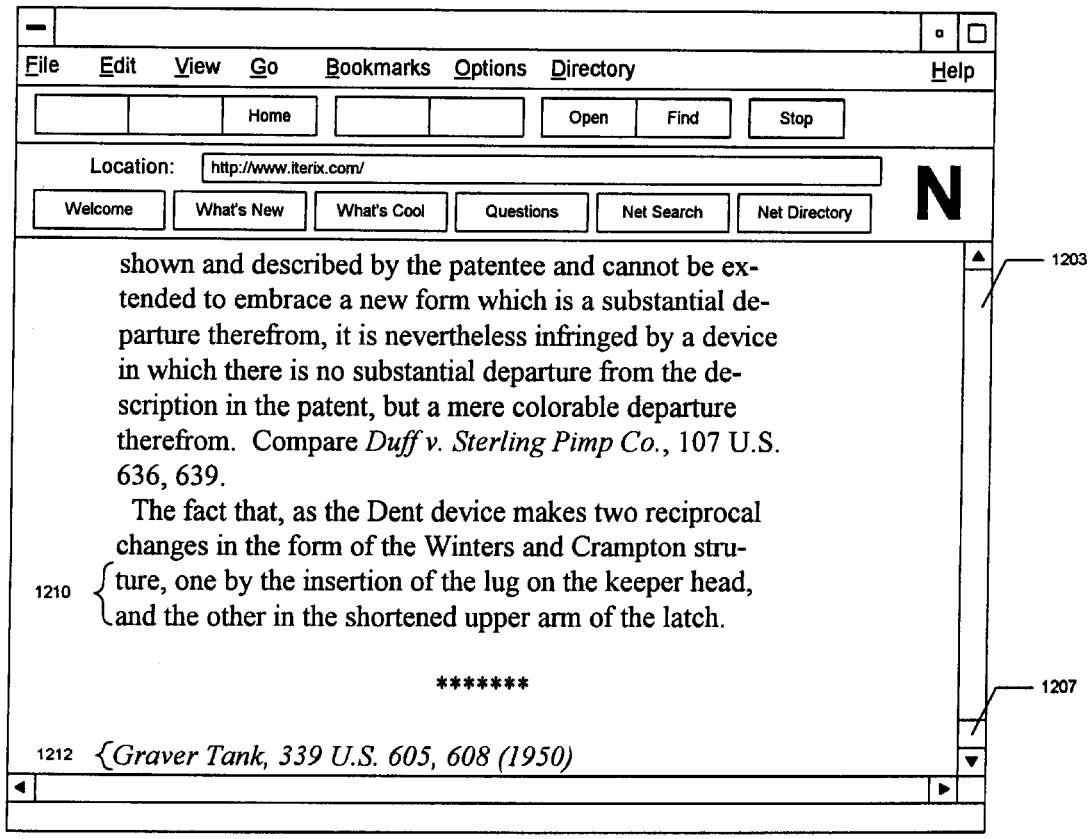
FIG. 12c illustrates the bottom of the web page of FIG. 12a, where a representation of a citing case is displayed at the bottom of the web page.

When the scroll box 1207 is moved to the bottom of the scroll bar, as shown in FIG. 12c, the bottom of the web page is shown. The last line of page 42 of U.S. Reports volume 280 is shown at 1210 in FIG. 12c. Below this last line is a representation 1212 of the Graver Tank case. This representation 1212 indicates that the Graver Tank case cites the displayed page (i.e., page 42 of U.S. Reports volume 280). The representation 1212 also indicates that the citation to page 42 of the Sanitary Refrigerator case is located at page 608 of U.S. Reports volume 339.

The representation 1212 in FIG. 12c is a link to another web page on the web server database. On the World Wide Web, these links are implemented with a hypertext protocol, such as HTML (HyperText Markup Language). As is well known in the art, selecting the representation 1212 will retrieve another web page from the appropriate web server. This new web page 1213 is shown in FIG. 12d, and as can be seen, the web page 1213 corresponds to page 608 of the Graver Tank case from volume 339 of the U.S. Reports.

Figure 12D:
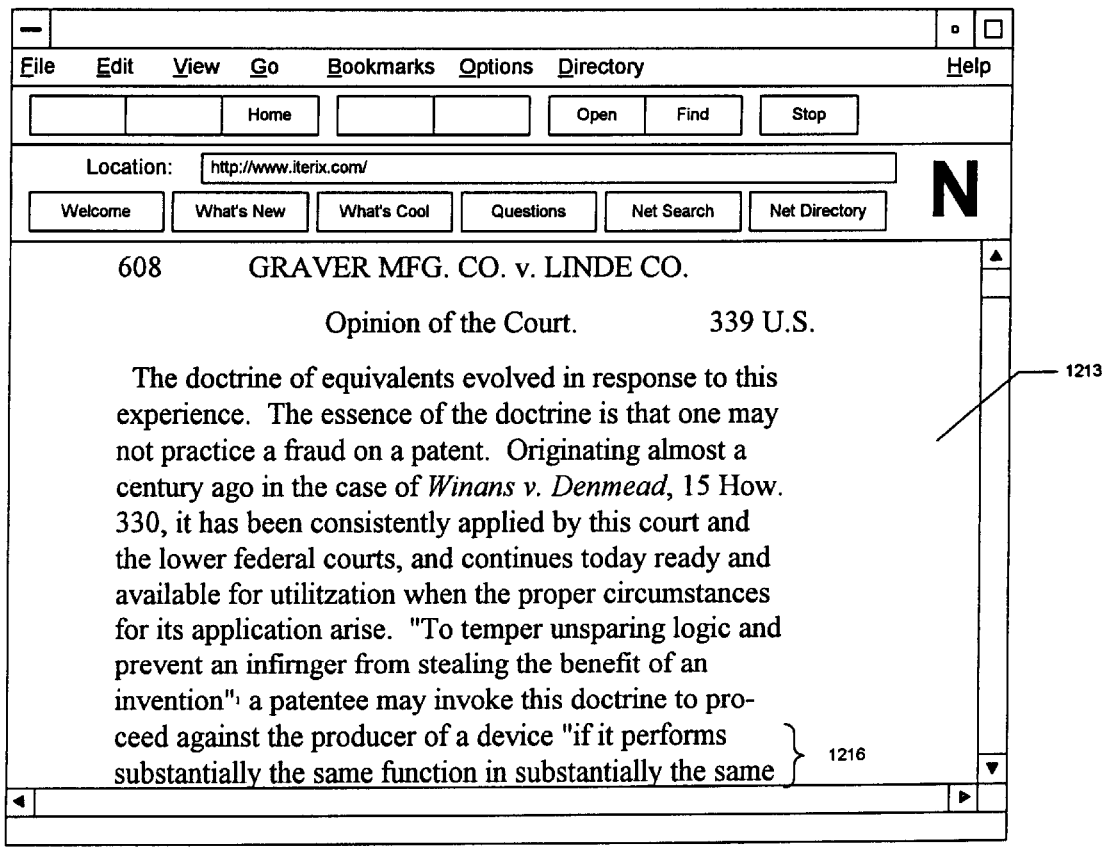
FIG. 12d is a view of the web page retrieved upon selection of the representation in FIG. 12c.
Figure 12E:
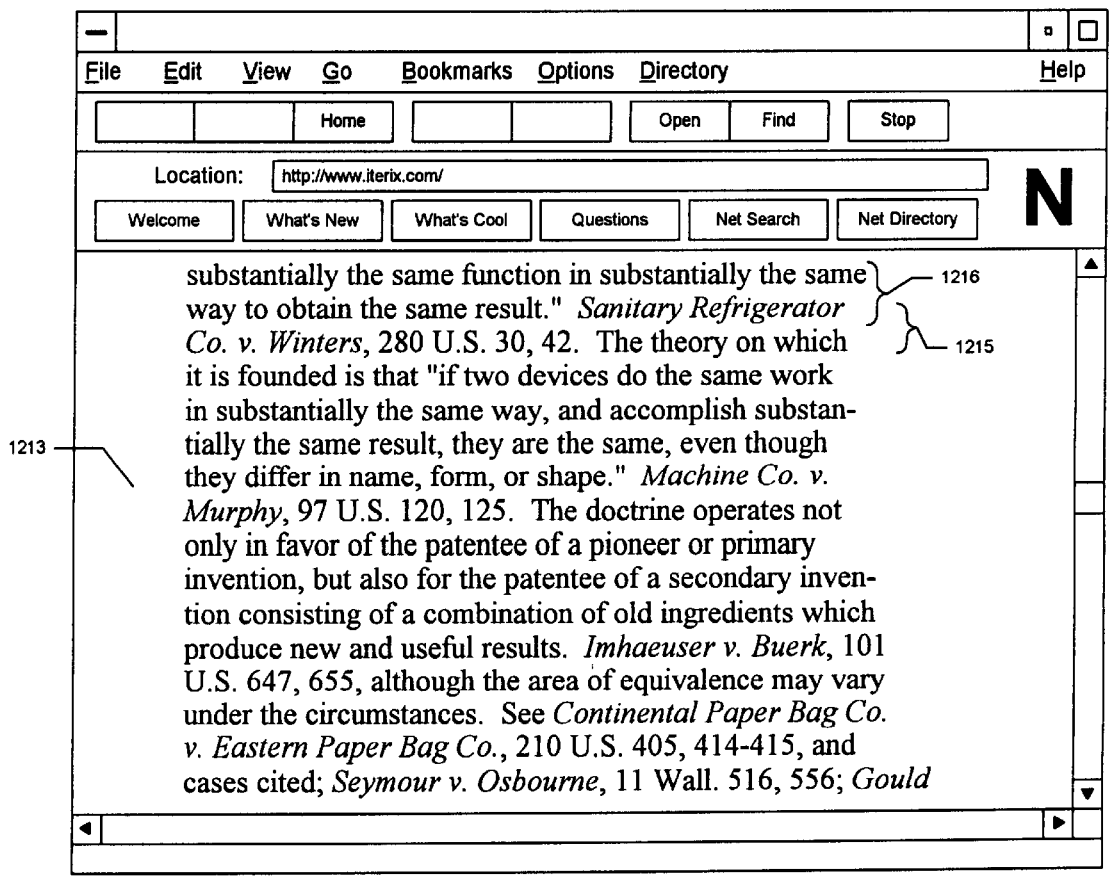
FIG. 12e is a view of a different portion of the web page of FIG. 12d.

FIG. 12e is the web page of FIG. 12d after the user has scrolled down the page a few lines. The citation to the Sanitary Refrigerator case is shown at 1215 in FIG. 12e. And as can be seen at 1216 of FIG. 12e (see also 1216 at FIG. 12d), the proposition for which the Sanitary Refrigerator case is cited is the function-way-result doctrine. This doctrine is set forth in the Sanitary Refrigerator case at 1218 in FIG. 12b, which is page 42 of U.S. Reports volume 280.

Figure 12F:
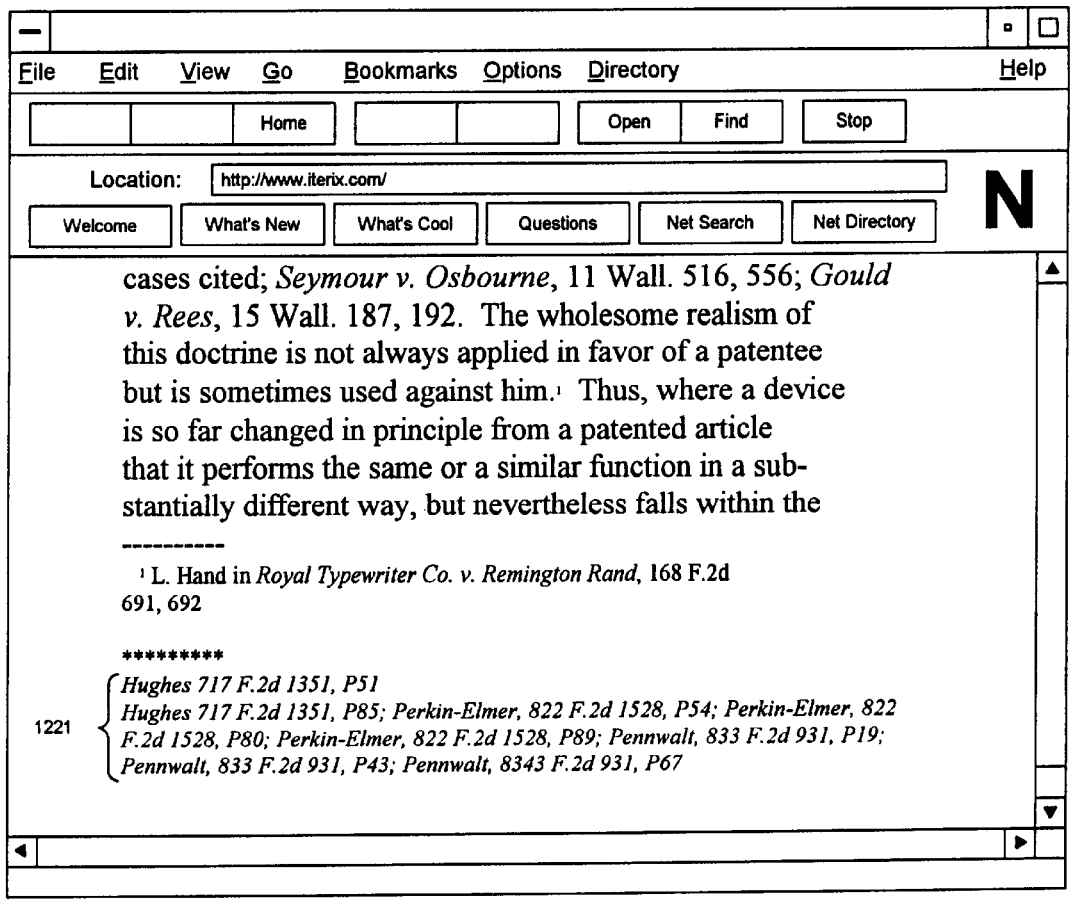
FIG. 12f illustrates the bottom of the web page of FIG. 12d, where representations of citing cases are displayed at the bottom of the web page.

FIG. 12f shows the bottom of the Graver Tank web page, which has at 1221 representations of citing cases. The Graver Tank text displayed in the web page of FIGS. 12d, 12e, and 12f corresponds to the first part of paragraph six in FIG. 5d. Thus, the citing cases shown represented in FIG. 5d are the same as the eight citing cases represented at 1221 of the web page in FIG. 12f. Selection of one of the eight representations 1221 will retrieve the corresponding web page.

In another embodiment, additional representations may be present at the bottom of the web page of FIG. 12f. Such additional representations may correspond to cases that cite the displayed case generally or at other pages, and not specifically the displayed page. In other words, it is not necessary to limit the representations in the embodiment of FIGS. 12a to 12f to only those cases that cite the displayed page of the document.

The World Wide Web implementation illustrated in connection with FIGS. 12a to 12f is particularly attractive because setting up the database of documents and configuring the cross-references to citing cases can be relatively straight-forward. Determining which of the cases cite a particular page is done, for the most part, by simply searching the text of the cases for a specific citation to each U.S. Reports page. A representation for each case that cites a given page in the U.S. Reports is generated and incorporated into the corresponding U.S. Reports web page. Thus, the citation system used by the court itself is used to determine the specific cross-references to and from the various cases, so no translation into other pages or paragraphs or line numbers or other units is necessary.

In other embodiments, where a citation system is used that is different from the system employed by the court, the court's citations must be translated into the citations used by the computerized research system. In other words, if a court cites cases by referencing a page number in a particular volume, and the research system uses a paragraph-based citation system (e.g., as in FIGS. 5a to 5i), the court's page number citations will be translated into corresponding paragraph number citations.

Although more tedious translation may be required, it is preferred that smaller units be used for the citation system. For example, a citation to a given page does not unequivocally identify which of the statements of law is being cited on that page. Therefore, not all of the citing cases for a particular page will be helpful to the researcher when he or she is interested in only one of the many statements of law occurring on the page. This problem is illustrated in FIGS. 5h and 5i, where the Conroy decision cited the Wilson case for a proposition that was different than the function-way-result issue that was being reviewed in FIGS. 5a to 5g. This occurred because paragraph 36 of the Wilson case contained more than one citable statement of law. A paragraph-based citation system is often better than a page-based citation system because paragraphs are usually smaller than pages and therefore contain fewer statements of law than do pages. But as shown in FIGS. 5h and 5i, a paragraph-based citation system is not immune to the problem.

A citation system employing an even smaller unit, such as a sentence-based citation system, would virtually eliminate the foregoing problem. However, such a citation system requires a significant amount of tedious translation if citations are not already in a sentence-based form.

In another embodiment of the present invention, the representations in the citing cases box would not necessarily correspond to the displayed text, but would rather correspond to displayed text that is specifically selected (i.e., highlighted) by the user. Such an embodiment would be particularly appropriate for a sentence-based citation system, because the selection of one or more sentences would indicate which citing cases are of interest to the user. In other words, when the user has selected a specific section of the displayed portion of a document, this can be an indication that the user wishes to see only those citing cases that correspond to the selected portion. Thus, in an embodiment of the present invention, the citing cases box could contain representations of only those citing cases that cite the selected portion of the displayed text.

It is contemplated that the present invention will be implemented, in at least some embodiments, on a computer that employs software to carry out the functions described above. The software is stored on a data storage medium that is accessible by the computer in a manner known in the art. The effective implementation of the present invention is obviously not necessarily dependent on the type of storage medium employed, and the data storage medium could therefore be of any type (including, without limitation, optical, magnetic, or hardware-based storage media).

Although the present invention has been shown and described with respect to preferred embodiments, various changes and modifications that are obvious to a person skilled in the art to which the invention pertains, even if not shown or specifically described herein, are deemed to lie within the spirit and scope of the invention and the following claims. The present invention is not to be limited to any specific database implementation or to any specific network implementation. What is contemplated is any system appropriate for practicing the invention as set forth in the claims. The cases and corresponding citing documents described herein are merely for illustration purposes, and no invention-related significance is to be given to them other than that specifically mentioned herein. In the claims, any means-plus-function clauses are intended to encompass not only structural equivalents but also equivalent structures.

What is claimed is:

1. A method of displaying information on a computer screen for a person operating a computer, the method comprising the acts of:

(a) displaying an application window on the computer screen, wherein the application window has associated with it both a document display area and a secondary area;

(b) retrieving a first document over a wide area network, wherein the first document is retrieved over the wide area network from a remote location that is not local to the computer;

(c) displaying the first document in the document display area associated with the application window so that at least a portion of the first document is visible in the document display area;

(d) displaying in the secondary area associated with the application window a plurality of representations of related documents that are relevant to the subject matter of the first document that is displayed in the document display area, wherein the representations of the related documents are each separately selectable within the secondary area, and wherein each of the related documents is an independent document that is not part of the first document;

(e) monitoring the person's selection of one of the representations in the secondary area;

(f) upon detecting the person's selection of one of the representations displayed within the secondary area in act (e), retrieving a second document over the wide area network, wherein the second document is the document that corresponds to the representation in the secondary area that was selected by the person operating the computer in act (e), and wherein the second document is retrieved over the wide area network from a remote location that is not local to the computer;

(g) displaying the second document in the document display area by replacing the first document in the document display area with the second document, wherein the second document is displayed so that at least a portion of the second document is visible in the document display area;

(h) automatically updating, without requiring further input from the person operating the computer, the representations of related documents displayed in the secondary area when the second document is displayed in the document display area, wherein the representations are updated so that they comprise a plurality of representations of related documents that are relevant to the subject matter of the second document that is displayed in the document display area, and wherein each of the related documents that are relevant to the subject matter of the second document is an independent document that is not part of the second document;

(i) monitoring input from the person operating the computer;

(j) upon receiving input from the person operating the computer in act (i), retrieving a third document over the wide area network, and wherein the third document is retrieved over the wide area network from a remote location that is not local to the computer;

(k) displaying the third document in the document display area by replacing a document displayed in the document display area with the third document, wherein the third document is displayed so that at least a portion of the third document is visible in the document display area; and (l) automatically updating, without requiring further input from the person operating the computer, the representations of related documents displayed in the secondary area when the third document is displayed in the document display area, wherein the representations are updated so that they comprise a plurality of representations of related documents that are relevant to the subject matter of the third document that is displayed in the document display area, and wherein each of the related documents that are relevant to the subject matter of the third document is an independent document that is not part of the third document.

2. The method of claim 1, wherein the information displayed in the secondary area is independent of the document displayed in the document display area, meaning that the information displayed in the secondary area is not part of the document displayed in the document display area.

3. The method of claim 2, wherein the act of displaying the first document in the document display area includes the acts of:

displaying the first document in a hypertext format; and permitting the person to manipulate a scroll bar associated with the document display area so that an undisplayed portion of the first document can be scrolled into the document display area.

4. The method of claim 3, further comprising the acts of:

(m) monitoring the person's selection of a backtrack button; and (n) displaying in the document display area a previously displayed document when the person selects the backtrack button.

5. The method of claim 4, wherein the act of displaying the first document in a hypertext format includes the act of displaying the first document in HTML.

6. The method of claim 5, wherein the related documents that are relevant to the subject matter of the document that is displayed in the document display area each discuss the subject matter of a document displayed in the document display area.

7. The method of claim 2, wherein the related documents that are relevant to the subject matter of the document that is displayed in the document display area each contain a link to a document displayed in the document display area.

8. The method of claim 2, wherein the related documents that are relevant to the subject matter of the document that is displayed in the document display area each contain a link to a document previously displayed in the document display area.

9. A computer that is operated by a user, wherein the computer comprises a display screen, an input device, and a connection to a wide area network, wherein the computer is programmed to:

(a) display an application window on the display screen, wherein the application window has associated with it both a document display area and a secondary area;

(b) retrieve a first document over the wide area network, wherein the first document is retrieved over the wide area network from a web server at a remote location that is not local to the computer;

(c) display the first document in the document display area associated with the application window so that at least a portion of the first document is visible in the document display area;

(d) display in the secondary area associated with the application window at least one representation of a related document that is relevant to the subject matter of the first document that is displayed in the document display area, wherein each representation of a related document is separately selectable within the secondary area, wherein the information displayed in the secondary area is not part of the first document, and wherein each related document is an independent document that discusses the subject matter of the first document and is not part of the first document;

(e) monitor the user's selection of a representation in the secondary area;

(f) upon detecting the user's selection of a representation displayed within the secondary area in act (e), retrieve a second document over the wide area network, wherein the second document is the document that corresponds to the representation in the secondary area that was selected by the user operating the computer in act (e), and wherein the second document is retrieved over the wide area network from a web server at a remote location that is not local to the computer;

(g) display the second document in the document display area by replacing the first document in the document display area with the second document, wherein the second document is displayed so that at least a portion of the second document is visible in the document display area;

(h) automatically update, without requiring further input from the user operating the computer, the at least one representation of a related document displayed in the secondary area when the second document is displayed in the document display area, wherein the representation(s) are updated to comprise at least one representation of a related document that is relevant to the subject matter of the second document, wherein the information displayed in the secondary area is not part of the second document, and wherein each related document is an independent document that discusses the subject matter of the second document and is not part of the second document;

(i) monitor input from the user operating the computer;

(j) upon receiving input from the user operating the computer in act (i), retrieve a third document over the wide area network, wherein the third document is retrieved over the wide area network from a remote location that is not local to the computer;

(k) display the third document in the document display area by replacing a document in the document display area with the third document, wherein the third document is displayed so that at least a portion of the third document is visible in the document display area; and (l) automatically update, without requiring further input from the user operating the computer, the at least one representation of a related document displayed in the secondary area when the third document is displayed in the document display area, wherein the representation(s) are updated to comprise at least one representation of a related document that is relevant to the subject matter of the third document, wherein the information displayed in the secondary area is not part of the third document, and wherein each related document is an independent document that discusses the subject matter of the third document and is not part of the third document.

10. The computer of claim 9, wherein the computer is further programmed to:

display the first document in a hypertext format; and permit the user to manipulate a scroll bar associated with the document display area so that an undisplayed portion of the first document can be scrolled into the document display area.

11. The computer of claim 10, wherein the computer is further programmed to:

(m) monitor the user's selection of a backtrack button; and (n) display in the document display area a previously displayed document when the user selects the backtrack button.

12. The computer of claim 11, wherein the computer is further programmed to display the first document in HTML.

\* \* \* \* \*